(12) United States Patent
Cutter

(10) Patent No.: US 10,827,672 B2
(45) Date of Patent: Nov. 10, 2020

(54) FIELD MONITORING, ANALYSIS, AND TREATMENT SYSTEM

(71) Applicant: Cutter Technologies, LLC, Tampa, FL (US)

(72) Inventor: Shawn Cutter, Tampa, FL (US)

(73) Assignee: Cutter Technologies, LLC, Tampa, FL (US)

( * ) Notice: Subject to any disclaimer, the term of this patent is extended or adjusted under 35 U.S.C. 154(b) by 301 days.

(21) Appl. No.: 15/458,828

(22) Filed: Mar. 14, 2017

(65) Prior Publication Data

US 2017/0258005 A1 Sep. 14, 2017

Related U.S. Application Data

(60) Provisional application No. 62/432,419, filed on Dec. 9, 2016, provisional application No. 62/374,702, filed on Aug. 12, 2016, provisional application No. 62/308,096, filed on Mar. 14, 2016.

(51) Int. Cl.

| | | |
|---|---|---|
| *B64D 1/18* | (2006.01) | |
| *A01C 21/00* | (2006.01) | |
| *B64C 39/02* | (2006.01) | |
| *A01B 79/00* | (2006.01) | |

(52) U.S. Cl.
CPC .......... *A01C 21/005* (2013.01); *A01B 79/005* (2013.01); *B64C 39/024* (2013.01); *B64D 1/18* (2013.01); *B64C 2201/12* (2013.01); *B64C 2201/123* (2013.01); *B64C 2201/146* (2013.01); *Y02A 90/40* (2018.01)

(58) Field of Classification Search
CPC ..... A01C 21/005; G05D 1/0011; G06F 19/00; B64C 39/024; B64D 1/18; A01B 79/005
See application file for complete search history.

(56) References Cited

U.S. PATENT DOCUMENTS

| | | | | |
|---|---|---|---|---|
| 4,015,366 | A * | 4/1977 | Hall, III | A01D 46/005 47/1.43 |
| 8,855,937 | B2 * | 10/2014 | Lindores | A01B 79/005 702/19 |
| 9,734,400 | B2 * | 8/2017 | Shriver | G01N 33/025 |
| 2006/0282467 | A1 * | 12/2006 | Peterson | G06Q 50/02 |
| 2015/0278640 | A1 * | 10/2015 | Johnson | G06K 9/00657 382/110 |
| 2015/0310721 | A1 * | 10/2015 | Johnson | A01G 22/00 340/540 |

OTHER PUBLICATIONS

Israel Weapon Industries (IWI), Tavor Assault Rifle—Armorer's Manual, Apr. 2007, 144 pages.

* cited by examiner

*Primary Examiner* — Mohamed Charioui
(74) *Attorney, Agent, or Firm* — Merchant & Gould P.C.

(57) ABSTRACT

Devices, such as mobile sensors and static sensors, monitor field health. A comparison to a baseline may facilitate detection of a field health issue. When an issue with field health is determined, a remedy may be deployed. Deploying a remedy may use an unmanned vehicle, such as an unmanned aerial vehicle, or a liquid distribution manifold.

20 Claims, 14 Drawing Sheets

FIELD MONITORING, ANALYSIS, AND TREATMENT SYSTEM

CROSS REFERENCE TO RELATED APPLICATIONS

This application claims priority to U.S. Provisional Patent Application No. 62/308,096, filed Mar. 14, 2016, 62/374,702, filed Aug. 12, 2016, and 62/432,419, filed Dec. 9, 2016; the entirety of each application is incorporated herein by reference.

BACKGROUND

Farming is a mainstay of modern society. Modern agricultural practices include monitoring field health and acting in response to data gathered from such monitoring to improve field and crop health. For example, drought, floods, fungus, disease, pests, weeds, and erosion are common challenges present in the practice of agriculture. Correspondingly, one may apply water, barricades, fungicides, pesticides, herbicides, and/or take other actions to improve the health of a field.

Identifying and improving field health, however, is often time and labor intensive. For example, current practices include teams of workers monitoring fields by walking or driving around. Large scale aerial surveillance vehicles such as helicopters and/or airplanes may be employed to gather information, but these are expensive and may not provide the desired accuracy or precision due to the distance required to cover hundreds and thousands of acres. Spot soil samples taken on great distances between each reading can lead to bad decisions based on false assumptions due to sparse data sets over infrequent periods of time. For example, infestations that begin in one area of a field or property can quickly spread if not detected and treated in a timely fashion. Since no two growing seasons are alike in temperature, crop generation, precipitation, soil characteristics, amount of sunlight, air quality, and other aspects, the accuracy of data normalization that could be performed over sparse samples over many years is further limited.

Further, once a problem with the field is detected, there is no easy way to deliver targeted, precise, and accurate treatment of affected areas. Rather, deployment of water, pesticides, fungicides, herbicides and the like are typically done on a scale that may be larger than necessary, which results in waste. Improvements have been made in the area of variable chemical application. The use of these improvements, however, is limited to early growth seasons in commercial applications. Although herbicide overuse has proved highly effective with regard to certain forms of plant life, it has also produced highly resistant super weeds such as marestail. Large batch applications of chemical treatment can also be rendered completely useless due to subsequent episodes of weather and precipitation that immediately follow the applications. Thus, technology that can effectively monitor and remedy field health for a single field, multiple fields, a farm, multiple farms, and other agricultural areas on a targeted basis is needed to solve these problems.

It is with respect to these and other considerations that embodiments have been made. Also, although relatively specific problems have been discussed, it should be understood that the embodiments should not be limited to solving the specific problems identified in the introduction.

SUMMARY

Aspects of the technology relate to networked enabled monitoring and application devices. In aspects, the devices are deployed in an agricultural field and used to monitor an agricultural field. Additionally, devices are deployed to treat the agricultural field based analyzing the monitored data against other data (including historical data). In a particular aspect, drones, static monitoring devices, and agricultural equipment (such as a combines) gather data on agricultural fields, or portions thereof. For example, moisture data, photographs, wind speed, temperature, etc., may be gathered. This information is then used to determine whether a portion(s) of the monitored field has a potential health problem. Determination may be carried out by a distributed computer network. Treatment may be carried out by delivering a treatment profile to a drone, which drone may carry out the treatment profile by treating an area of the field (such as by, for example, spraying a portion of a field with an herbicide). Additionally or alternatively, additional monitoring may be carried out.

DESCRIPTION OF THE TECHNOLOGY

Figure 1:
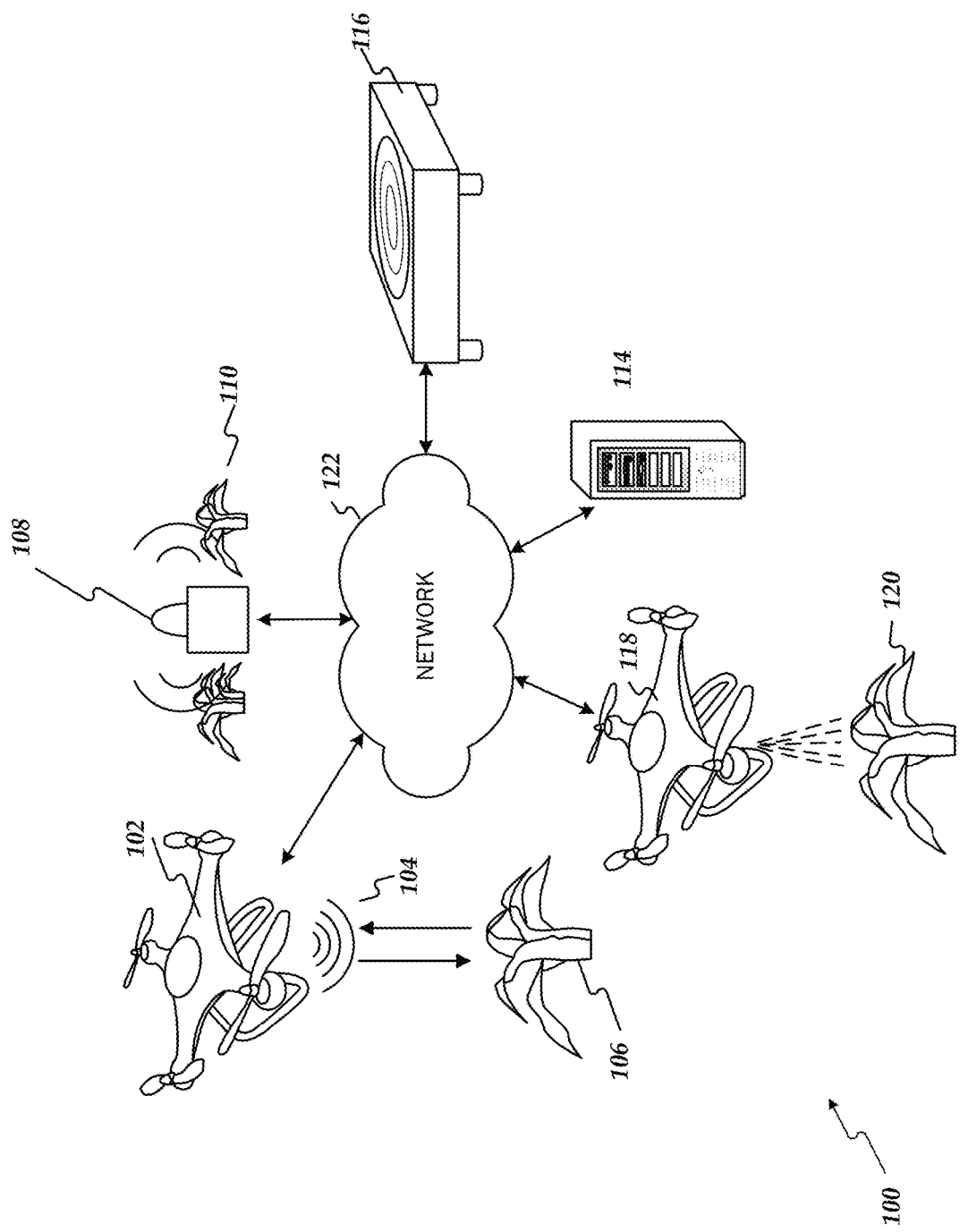
FIG. 1 illustrates a networked system for monitoring, analyzing, and treating agricultural fields.

FIG. 1 illustrates a networked system 100 for monitoring, analyzing, and treating agricultural fields. As illustrated, the system includes pods, sensors, and unmanned devices (e.g., drones) to gather and communicate information related to agricultural fields. In aspects of the technology, the system uses drones, agricultural equipment, and pods as nodes in the network, each of which may be capable of monitoring field health, treating one or more plants, and communicating with other drones/pods. The system 100 includes mobile monitoring devices (e.g., mobile monitoring device 102), static monitoring devices (e.g., static monitoring device 108), mobile-deployment devices (e.g., static deployment device 118), pods (e.g., pod 116), a network 122, and a central analytics computing system 114 for receiving, analyzing, and presenting information obtained from the system of pods and devices.

As illustrated, FIG. 1 includes a mobile-monitoring device 102. The mobile-monitoring device 102 may be an unmanned remote aerial vehicle, a remote controlled ground vehicle, or a similar device. In aspects of the technology, the mobile monitoring device 102 is affixed or integrated into farming equipment, such as harvesters, combines, trucks, etc. This equipment may be manned or unmanned. The mobile-monitoring device 102 may be equipped with a variety of sensors, such as a camera, video-recording system, infrared-camera system, and/or other sensing equipment to gather information regarding plants in a field, such as a first portion of an agricultural field 106. In some instances, the mobile-monitoring device 102 may send a scanning signal 104 (such as a LIDAR scanning signal) to survey a first portion of an agricultural field 106.

The mobile monitoring device 102 may include the following features: weather resistance, ability to maintain an extended flight time (e.g., in excess of 30 minutes), directional flight and hover capabilities, quick couplers to dock to stations (e.g., stations located on the pod 116), communication hardware, and onboard software systems. The onboard software systems may include software to facilitate the navigation of the mobile monitoring device 102 and/or software to monitor plants in first portion of an agricultural field 106 or a second portion of an agricultural field 110. The mobile monitoring device 102 may have other features such as physical means to apply treatment to a field.

As illustrated, the mobile monitoring device 102 is monitoring the first portion of an agricultural field 106. In aspects of the technology, the first portion of the agricultural field 106 may include one or more plants and may be as large as the entire planting space of an agricultural field or as small as a single plant. That is, the mobile-monitoring device 102 may have a variety of sensors that can gather a variety of information on the various portions of an agricultural field, including the first portion of the agriculture field 106.

Monitoring the health of an agricultural field may also be performed by a static-monitoring device 108. As illustrated, the static-monitoring device 108 is placed in a second portion of an agricultural field 110. Indeed, the second portion of the agricultural field 110 may differ from, be the same as, include, or be included within the first portion of an agricultural field 106. Further, the agricultural fields in which the mobile monitoring device 102 and the static-monitoring device 108 operate may differ. Conversely, the static-monitoring device 108 may collect the same or similar information as the mobile-monitoring device 102. The static-monitoring device 108 monitors for moisture content, ground temperature, air temperature, motion detection, sun intensity and duration, wind speed and direction, soil chemistry, etc.

FIG. 1 also includes a pod 116. In aspects, a pod 116 is adapted to house one or more mobile-monitoring devices, such as mobile-monitoring device 102 and mobile-deployment device 118. In aspects, the pod 116 acts as a static-monitoring device in addition to housing mobile-monitoring devices. The pod 116 may include various canisters that hold treatment media for treating plants (such as water, fertilizer, pesticides, fungicides, herbicides, butane, etc.).

FIG. 1 includes a central analytics computing system 114. As illustrated, the central analytics computing system 114 is one computer, but it may be multiple computers. Indeed, aspects of the technology include the pod 116, the mobile-monitoring device 102, the static-monitoring device 108, and/or the mobile deployment device 112 performing some or all of the calculations and analytics described herein.

In aspects of the technology, the central analytics computing system 114 receives information from a mobile-monitoring device 102, a static monitoring device 108, the pod 116, the mobile-deployment device 118, and/or other sources. The information gathered from these sources may include information about the health and treatment of an agricultural field. In aspects of the technology, the central analytics computing system uses this information to make determinations about which portions of an agricultural field to monitor and/or treat. For example, a mobile-monitoring device may send information related to infrared scans, pictures, or other recorded data regarding a portion of an agricultural filed, such as a first portion of an agricultural field 106. The information may indicate that a portion of an agricultural field, such as a first portion 106, is infested with a foreign species of plant, infested with insects, is showing signs of drought, requires fertilizer, etc. This may be done by comparing the information gathered with previous information, with standardized information, and/or with other types of information. Once it is determined that a portion of an agricultural field requires treatment, the portion of the field may be tagged. The information regarding what portion of the agricultural field requires treatment, as well as the type of treatment, may be sent to a mobile-deployment device 118.

The mobile-deployment device 118 may receive information from the central analytics computer 114. In aspects, the mobile-deployment device 118 may be an unmanned remote aerial vehicle, unmanned remote controlled ground vehicle, or similar device. As illustrated, mobile-deployment device 118 is an unmanned aerial vehicle (e.g., a drone). In aspects of the technology, a mobile-deployment device 118 will target one or more plants 120 based on information received from the central analytics computer system 114. The targeting of plants 120 may be for the purposes of removal (e.g., in the case of an herbicide), treatment (e.g., in the case of pesticide), or enrichment (e.g., in the case of fertilizer). Other reasons to target a plant are contemplated.

Mobile-deployment device 118 may receive a series of instructions from a central computer 114 in order to identify what plants to target. For example, target plants 120 may have been monitored by a mobile-monitoring device 102 and/or static monitoring device 108. The information recorded from the monitoring may have been sent to a centralized analytics computer system 114. Based on the information, the centralized analytics computer system 114 may have determined that the targets plants 120 require treatment. A message may then have been sent to the mobile-deployment device 118 to treat the target plants 120.

A network 122 may be used to facilitate communication between the elements of system 100. The network 122 may use infrared, BLUETOOTH® wireless technology, ZigBee, WiFi, WiMax, cellular and other radio frequency communication, nearfield communication, or other technology to facilitate communication. In aspects of the technology, a mobile-monitoring device mobile-monitoring device 102, a static monitoring device 108, the pod 116, and/or the mobile-deployment device 118 may not be connected to a network. Rather, the information gathered by physical means, such as a removable storage device or data transfer cable.

For example, a static monitoring device 102 may store information locally. The static monitoring device 108 may have RFID communication, blue tooth, or other nearfield communication technology. A mobile-monitoring device 102 or mobile-deployment device 119 may gather the information when the mobile monitoring device 102 (and/or the mobile-deployment device 119) is in proximity to the static monitoring device 102. The data may be tagged with a location identifier either by using the location of the mobile monitoring device 102 (and/or the mobile-deployment device 119) or the static monitoring device 102.

Figure 2:
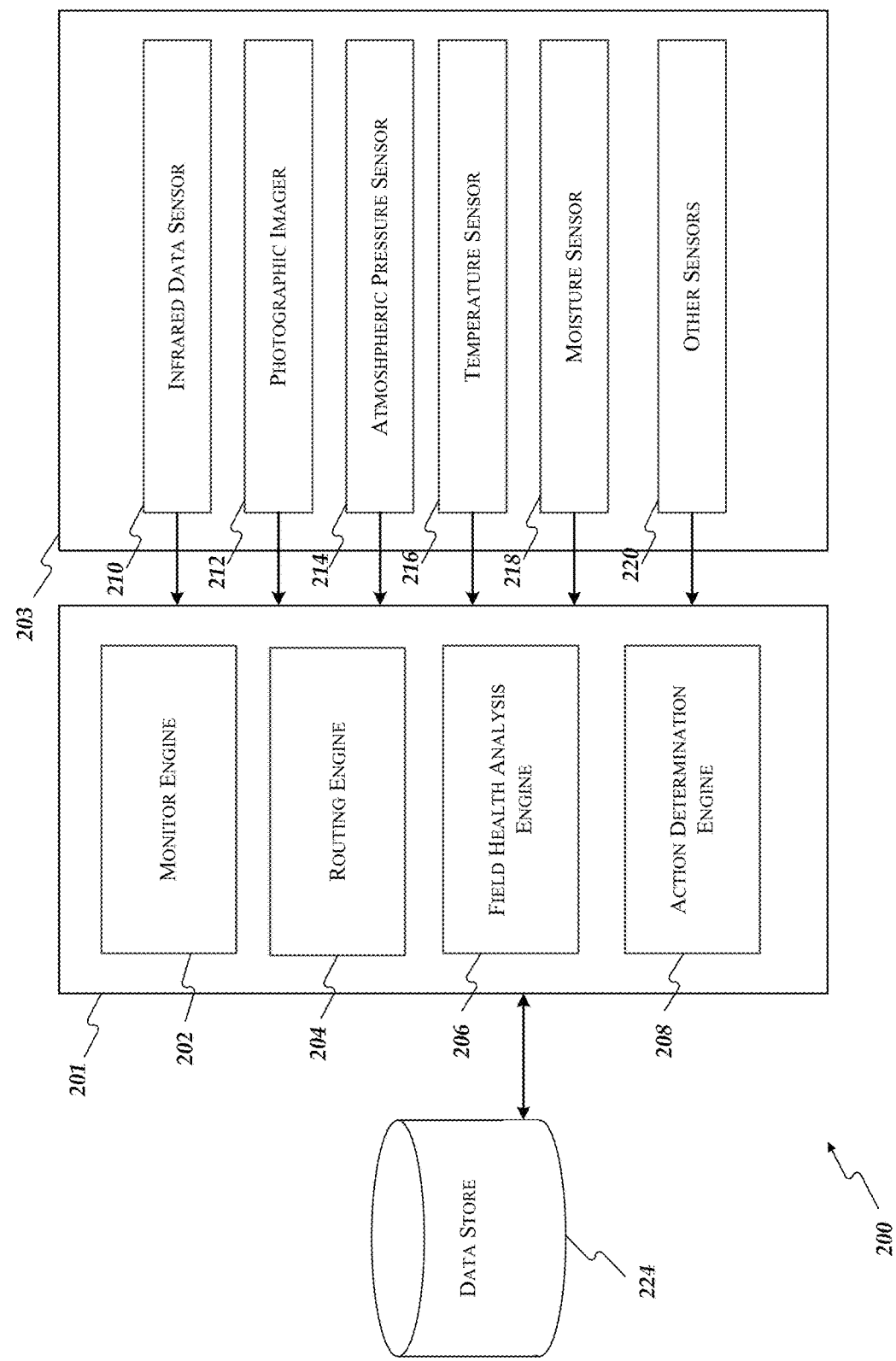
FIG. 2 is an example of an architecture for monitoring field health and treating fields.

FIG. 2 is an example of a system 200 for monitoring field health and treating fields. System 200 includes a monitor engine 202. The monitor engine 202 compiles information from a variety of sources to determine whether monitoring attributes (e.g., type, frequency, duration of information collected, etc.) of a field or portion of a field should be altered. The information regarding field health may have a timestamp. The sources of information may be from the sensors 203, the data store 224, and/or other third-party sources. For example, information regarding a field (e.g., crop type, crop density, planting orientation, location, crop history, etc.) may be stored in the data store 224. The information may be used in combination with other information, such as past weather (e.g., high rain, which may be pulled from an Internet Source or the data store 224), weather forecasts, and moisture sensor 218 to determine that a field should be monitored for potential issues related to high moisture content. For example, the information may be used to calculate a probability that portions of the field are likely to have issues, such as mold, fungus, pests, drought, etc. If the probability is within a certain threshold, in aspects, the monitoring engine 202 determines that the field or portion of a field should have its monitoring altered to be on watch for a particular issue. The monitoring engine may then send a request to the routing engine 204 to schedule additional monitoring of the field.

The routing engine 204 receives requests from one or more monitoring engines, such as monitoring engine 202. The routing engine 204 analyzes the request from the monitoring engine 202. In aspects, the request from the monitoring engine 202 includes the location of the field or portion of the field that may have an issue. The request may also include field information, such as an indication of the potential existence of mold, fungus, drought, pest, weeds, etc., as well as the type of field, the current weather, and the time of day, etc. In other/additional aspects, the request includes information for the routing engine to pull such information from the data store 224, such as a field identifier. Based on the request, other requests, the field information, and/or other information, the routing engine 204 determines whether to change monitoring.

As a non-limiting example, the monitoring engine 202 may make a determination that a portion of a field should be further monitored. This determination may be based on past weather information (e.g., gathered from the Internet), crop type (e.g., identified as tomatoes), moisture content (e.g., gathered from a static sensor). The monitoring engine 202 may then determine that additional information needs to be gathered to determine whether a portion of a field is experiencing a health issue. This may occur when the monitoring engine 202 determines that the conditions are such that the health of the field may be in trouble. In aspects, the monitoring engine makes a determination as to what information it would like to gather on the field in order to improve the confidence level (e.g., a threshold level) that the field is experiencing a health issue. Such information may include temperature data, soil-moisture data, atmospheric pressure information, photographic images, etc. The monitoring engine 202 may then send a request to the routing engine to gather the determined information from the data store 224, as well as the location of the field.

The routing engine 204 receives the request and determines how to handle the request. For example, the routing engine 204 may have received multiple requests to take photographs of various portions of fields. The routing engine may group the requests into a single instruction packet and send routing instructions to a mobile-monitoring device to take photographs of each field portion. When doing so, the routing engine may calculate a path for the mobile-monitoring device. Such calculations may consider the maximum distance/flight time of the mobile monitoring device.

Alternatively/additionally, the routing engine 204 may receive a request for more information from a monitoring engine and, in response, may change the frequency/duration of monitoring of a static monitoring device. For example, a static monitoring device may be set to take a moisture reading every 5 days. Such setting may be determined as a baseline to conserve energy usage/data requirements. After receiving a request from the monitoring engine 202, the routing engine 204 may send an instruction to a static-monitoring device to increase/decrease the duration and/or frequency of monitoring.

Information regarding field health of a field is sent to field health analysis engine 206. The field health analysis engine 206 analyzes information regarding a field and determines whether/what type of remedy/action to apply to a portion of a field. For example, the field health analysis engine 206 may receive information from static-monitoring devices, mobile monitoring devices, other databases, the Internet, etc., to determine a remedy. The field health analysis engine 206 may use data gathered from the various sources of information to determine that a portion of a field is experiencing an infestation of a foreign specifies of plant. The health analysis engine 206 may then send the identified health problem to the action determination engine 208.

The action determination engine 208 receives identified health problem information and, based in part on the received identified health problem information, determines whether/how to remedy the identified health problem information. For example, the action determination engine 208 may receive information from a field health analysis engine 206 that a portion of the field has been infested with an invasive species of beetle. The action determination engine 208 may determine to deploy pesticide, continue monitoring the field, and/or deploy another remedy. The determination of the remedy may be based on the health problem and/or user preference.

FIG. 2 also includes sensors 203 in communication with the field health system 201. As illustrated, sensors 203 include an infrared sensor 210, a photographic sensor 212, an atmospheric sensor 214, a temperature sensor 216, a moisture sensor 218, as well as other sensors 220. As illustrated, these sensors communicate information to field health system 201. While the sensors are illustrated as being in one-way communication, in alternative/additional embodiments, the sensors are in two-way communication with the field health system 201.

Data store 224 stores a variety of information that may be used in system 200. For example, data store 224 may store information captured by sensors 203. In addition, historical information may be captured and/or kept in data store 224.

In embodiments, the system is configured with a standard monitoring routine that includes, for example, monitoring temperature and moisture in a portion of a field, as well as capturing images of crops in the portion of the field at a predetermined interval. The standard routine may be configured for different types of crops, different field locations and other factors.

Figure 3:
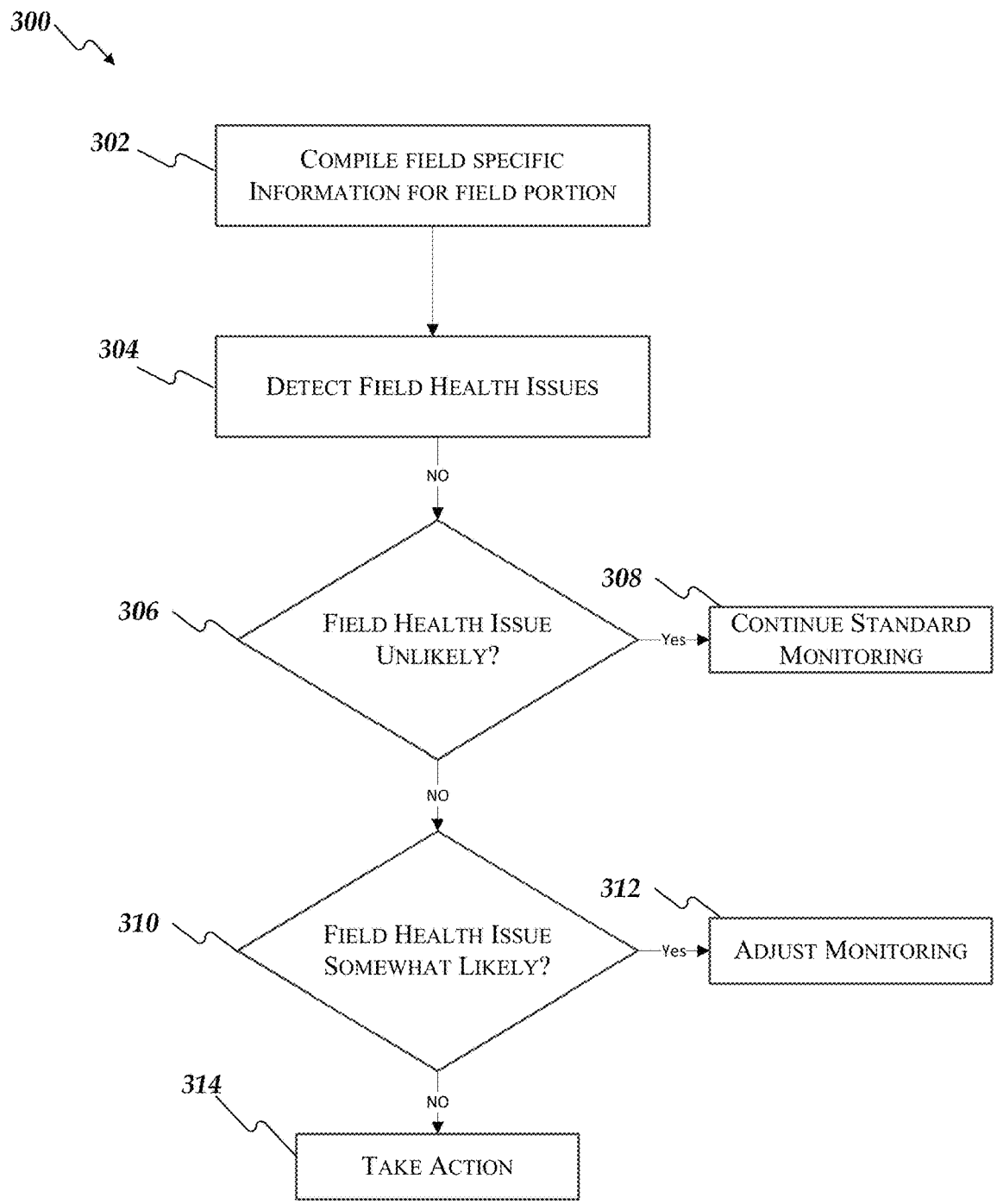
FIG. 3 illustrates a computer environment to receive field health information and analyze field health information.

FIG. 3 illustrates a method for detecting and remedying current field health issues for a portion of a field, such as field 106. Method 300 begins at operation 302 where field-specific information regarding a portion of a field is compiled from various sources including sensors 203 and monitoring devices 102 and 108. Specific information such as moisture content, crop type, number of plants, GPS location of the field and of each plant, soil chemistry, temperature, plant size, etc., may be compiled. In addition, other information may also be compiled such as typical plant size and other characteristics (e.g., leaf size, shape, color, etc.), growth charts, local weather forecast, historical weather data, optimal conditions for the type of plant in the portion of field, and the like. The compiled field-specific and other information may come from a variety of sources. For example, the information may come from a database, such as data store 224 or a third party data store, a mobile-monitoring device, a static-monitoring device, the Internet, and/or another source.

Method 300 then proceeds to determine the likelihood of a field health issue via the field health operation 304. Likelihood of field health issues may be determined by comparing the compiled field-specific information against expected information for that portion of the field to detect a deviation in actual versus expected information. For example, the data store 224 may contain information about the expected height of a plant at a given age for the plant species that is growing in the portion of a field. Height information for each plant may be compiled in operation 302 using for example photographic imager 212. For example 3D point clouds along with topographic data will be used to determine the height. Further, the data store 224 may include information about the age of each plant, such as the planting life-cycle. The system compares the actual height of the plant against the expected height of the plant. If the actual height deviates from the expected height by a predetermined margin, the system may determine that there is an actual health issue with one or more plants within the portion of the field. This information may be analyzed using statistical methods, such as regression analysis to determine whether there is an adverse health issue. Additionally/alternatively, a machine-learning model may be used. A confidence score may be associated with the determination.

For example, field health problems may be identified by comparing the expected discoloration of a plant strain to the same or nearby fields with the same strain. As a specific example, discoloration of leaves can be derived from a series of NDVI images. The system may use multiple sets of variable inputs to make a determination of the cause of discolorations and potentially unhealthy plants. In aspects, a determination as to whether each plant in a field has a health issue is made.

Determination of field health issues may be made using the compiled information regarding actual conditions and measurements and forecasts, which may be compared against optimal or historic conditions to detect a potential for a problem. As an example, the compiled information may include: (1) historic data from third party sources relating to average rainfall for the geographic region in which the field is located; (2) current rainfall data from third party sources for the same geographic region indicating that the current rainfall is higher than the historic average rainfall; (3) historic moisture data captured from a static monitoring device located in the portion of the field at issue; (4) current moisture data from the same static monitoring device; (5) historic temperature information from the field's geographic region; (6) current temperature information from a static monitoring device taken from the portion of the field indicating that the temperature is higher than the average temperature for this geographic region; and (7) information from the system's data store about the type of crop growing in the field. This information may be analyzed using statistical methods, such as regression analysis to determine whether there is a potential health issue. Additionally/alternatively, a machine-learning model may be used. A confidence level may also be associated with the determination. For example, the system may conclude that the soil has much more moisture than is optimal for the type of plant(s) growing in the portion of the field. Based on the compiled information, the system may determine that there is a potential for a fungal infection with a confidence of 40%. As discussed above, the system is capable of determining whether or not there is a potential health issue with each plant in the portion of the field. Further, the system may determine that there are no potential health issues, one potential health issue, or many potential health issues.

The method then proceeds to determination 306. In determine operation 306, it is determined whether a field health issue is unlikely. This may occur where the confidence score assigned in operation 304 is below a certain threshold. For example, where there is little indication that there is a field health issue, a confidence score may be set at 90% to indicate that there is no field health issue. Alternatively/additionally, a potential field health issue may have a very low confidence score (e.g., below 10% indicates that a field has fungus). The threshold may be set by a user. If a field health issue is unlikely, the method proceeds to continue standard monitoring operation 308. In operation 308, the previous monitoring is maintained.

If the field health issue is not unlikely, the method proceeds to determination operation 310. In determination operation 310, it is determined whether a field health issue is somewhat likely. This determination may be made using the confidence score determined at operation 304. For example, a lower and upper threshold confidence score may be used to determine whether a field health issue is somewhat likely. As a particular example, it may be determined that a field health issue is somewhat likely where a lower threshold is 30%, and upper threshold is 70%, and the assigned confidence score is 50%. Threshold levels may be set by a user, or determined by other means.

When field health issues are somewhat likely, the method proceeds to adjusting monitoring operation 310. In operation 310, the monitoring is adjusted. Monitoring may be adjusted in a way that will aid in determining whether field health is an issue. For example, where it is determined that drought may be an issue (e.g., based on image data), moisture sensors in the potentially affected area may be turned on.

If it is determined that a field health issue is not somewhat likely, the method proceeds to take action. At take action operation, it is verified that the confidence score assigned at operation 304 is higher than a threshold, indicating a specific field health issue. Action is then taken to remedy the field health issue. For example, where the field health issue is drought, the irrigation schedule may be changed (or a message to a user may be sent to change the irrigation schedule).

Figure 4:
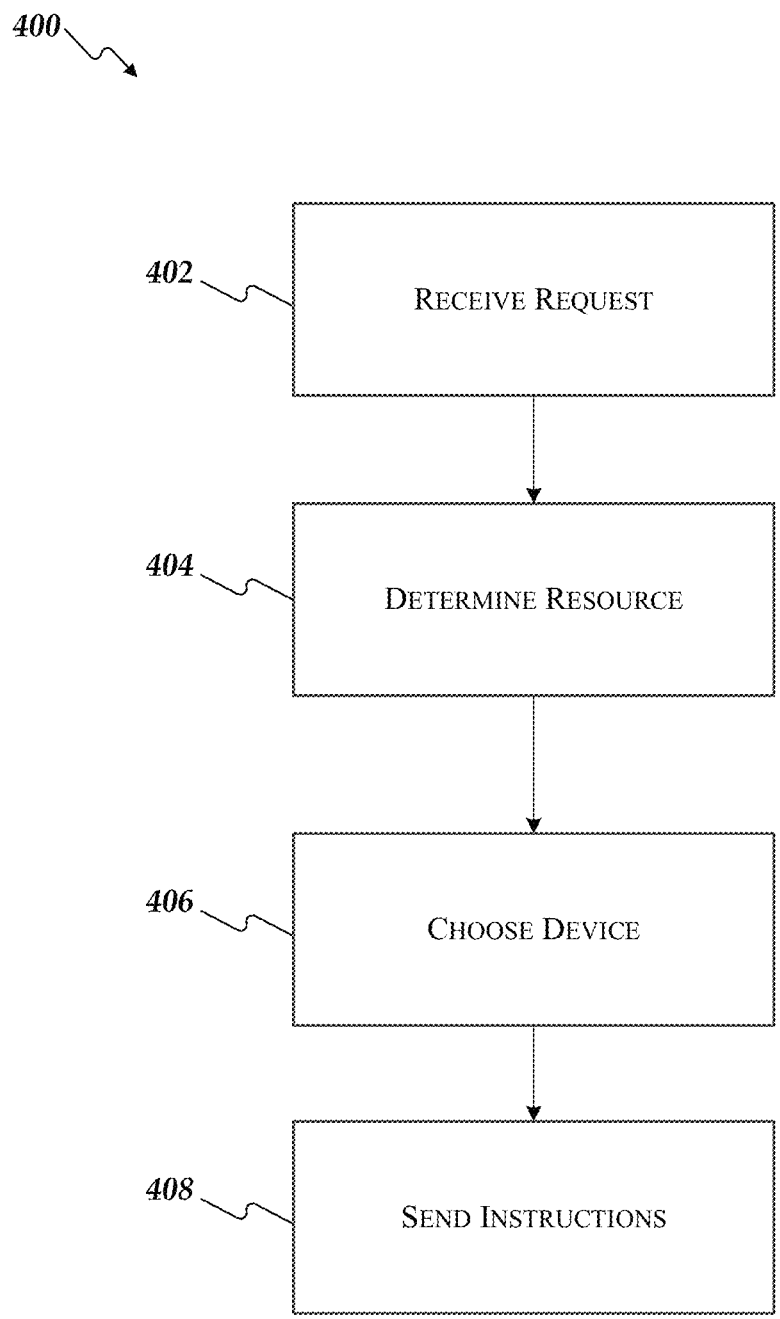
FIG. 4 illustrates a method 400 for routing requests for additional information.

FIG. 4 illustrates a method 400 for routing requests for additional information and/or requests for additional monitoring. Method 400 begins with receive request operation 402. In receive request operation 402, a request is received for additional information regarding an agricultural field or portion of an agricultural field. In aspects, the request may include the location of the field and the type of information requested. For example, a request may include GPS coordinates of a field and request additional photographic information. Other types of information may be requested. The request 402 may also or alternatively request additional monitoring, such as the additional monitoring of step 322 from FIG. 3.

Method 400 then proceeds to determine resource operation 404. In operation 404, the information requested is matched to one or more data collection resources. For example, if the information sought includes photographic images, devices (e.g., mobile monitoring devices or static monitoring devices) may be identified. That is, a portion of an agricultural field may be situated such that a static monitoring device may have a camera capable of taking images. Such devices would be identified. Additionally/alternatively a mobile monitoring device, such as an unmanned aerial vehicle, may be identified as having a camera capable of providing the requested images with additional monitoring.

Method 400 then proceeds to choose device operation 406. In operation 406, from the set of devices identified in operation 404, a device is determined to gather the additional information. For example, if both a mobile monitoring device and a static mobile device are capable of gathering the additional information, at least one device is determined. Determining the device may be determined based on a set of rules such as cost, availability of device, urgency of request, etc.

Method 400 then proceeds to send instructions to identified device operation 408. In operation 408, instructions to capture information are sent to the identified device. In aspects of the technology, instructions related to how the information should be captured are sent to the one or more devices capturing the information. Instructions may include a number of data points (e.g., images, soil samples, etc.) to collect, time of day to collect information, location to collect information, etc.

Figure 5:
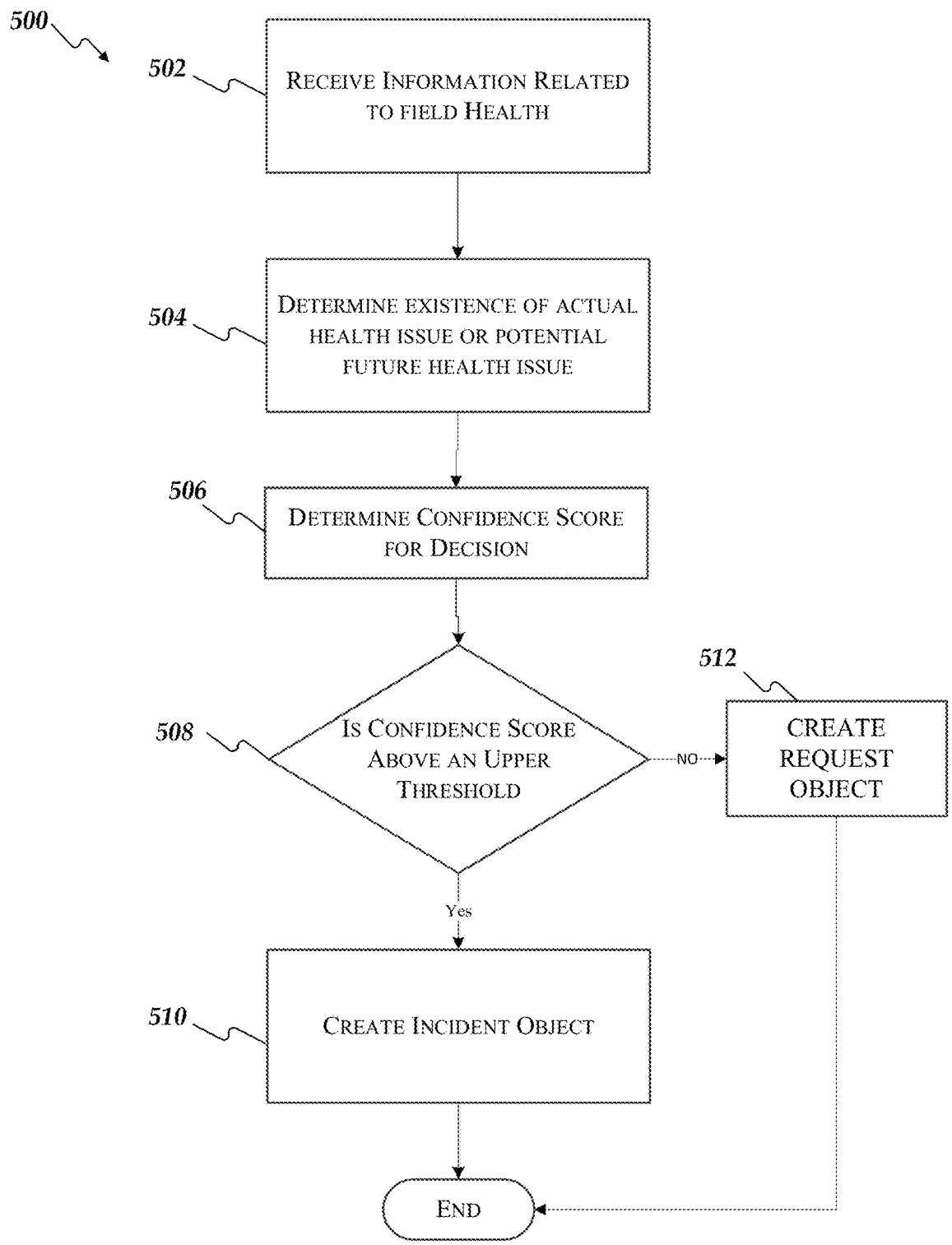
FIG. 5 illustrates a method 500 for determining the health of an agricultural field.

FIG. 5 illustrates a method 500 for determining the health of an agricultural field. Method 500 begins with receive field-health information operation 502. In operation 502, information related to the field health is received. Information may be received from sensors, the data stores, and/or other third-party sources.

Method 500 proceeds to analyze information operation 504. In operation 504 the information is analyzed to determine whether a portion of a field has an actual health issue, such as decision 306 in FIG. 3 or a potential health issue, such as decision 312 in FIG. 3.

At step 506, the system determines a confidence score or other indicator for this determination, which provides an indication of the accuracy of this determination (e.g., the likelihood that the field has an actual health issue or potential health issue). This may occur using regression analysis, machine learning models, or other means.

Method 500 proceeds to determine whether the confidence score determined in step 506 exceeds a predetermined threshold. The value may be hard coded, or may be set via user preference. If the confidence level is above the predetermined threshold level, then a health incident object is created at operation 508. If not, no object is created and the method end.

Figure 6:
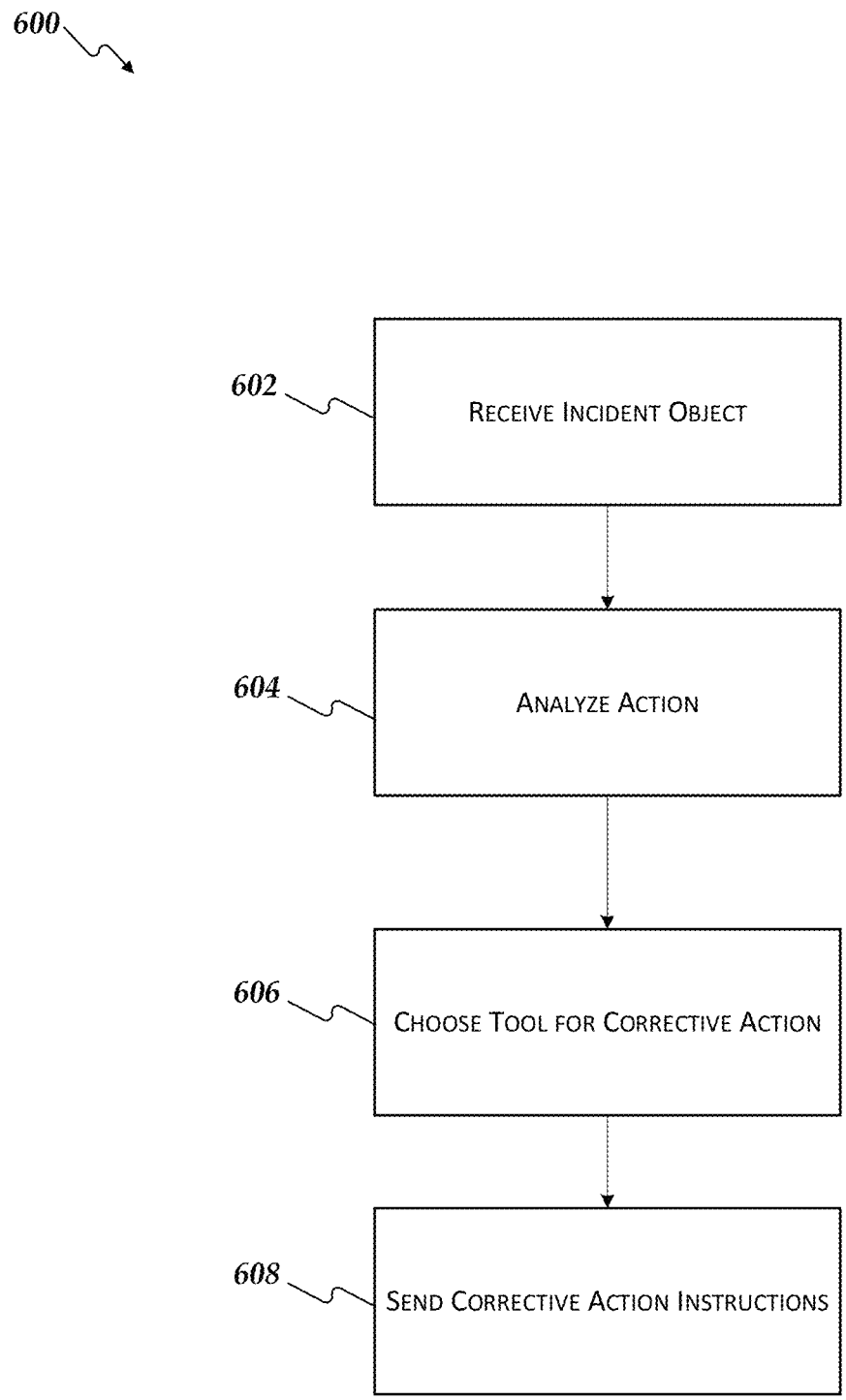
FIG. 6 illustrates a method for determining a remedy for a health issue related to an agricultural field.

FIG. 6 illustrates a method for determining a remedy for a health issue related to an agricultural field. Method 600 begins with receive incident object operation 602. At operation 602, an object is received indicating a potential health issue with a field. This may include pests, drought, fungal infection, etc. Detailed information may be provided such as "there is a very high likelihood that this section of crop is infested with spider mites."

The method then proceeds to analyze operation 604. In analyze operation 604, the incident objects along with other information are analyzed to determine a potential remedy. For example, an incident object may indicate a potential fungal infection, database information may identify the plant as a tomato plant, and farmer preference information (located in a database), may be used to determine to treat the plant with a fungicide. In aspects, the analysis includes determining a treatment regimen.

Method 600 then proceeds to choose tool for taking corrective action operation 606. For example, a set of potential remedy tools (e.g., mobile devices, static devices, etc.) may be stored in a database. Of that set, only some of the potential remedy tools may be capable of taking the action. For example, only some drones may be equipped with an herbicide deployment device. The set of capable tools may additionally be filtered by current availability of the tools. From this set of filtered tools, a tool is determined.

Method 600 then proceeds to send instruction operations 608. In operation 608, instructions are sent to the identified tool. This may include a corrective action to take, the duration and frequency of the corrective action, a flight path (in instances where a UAV is used), etc.

Figure 7:
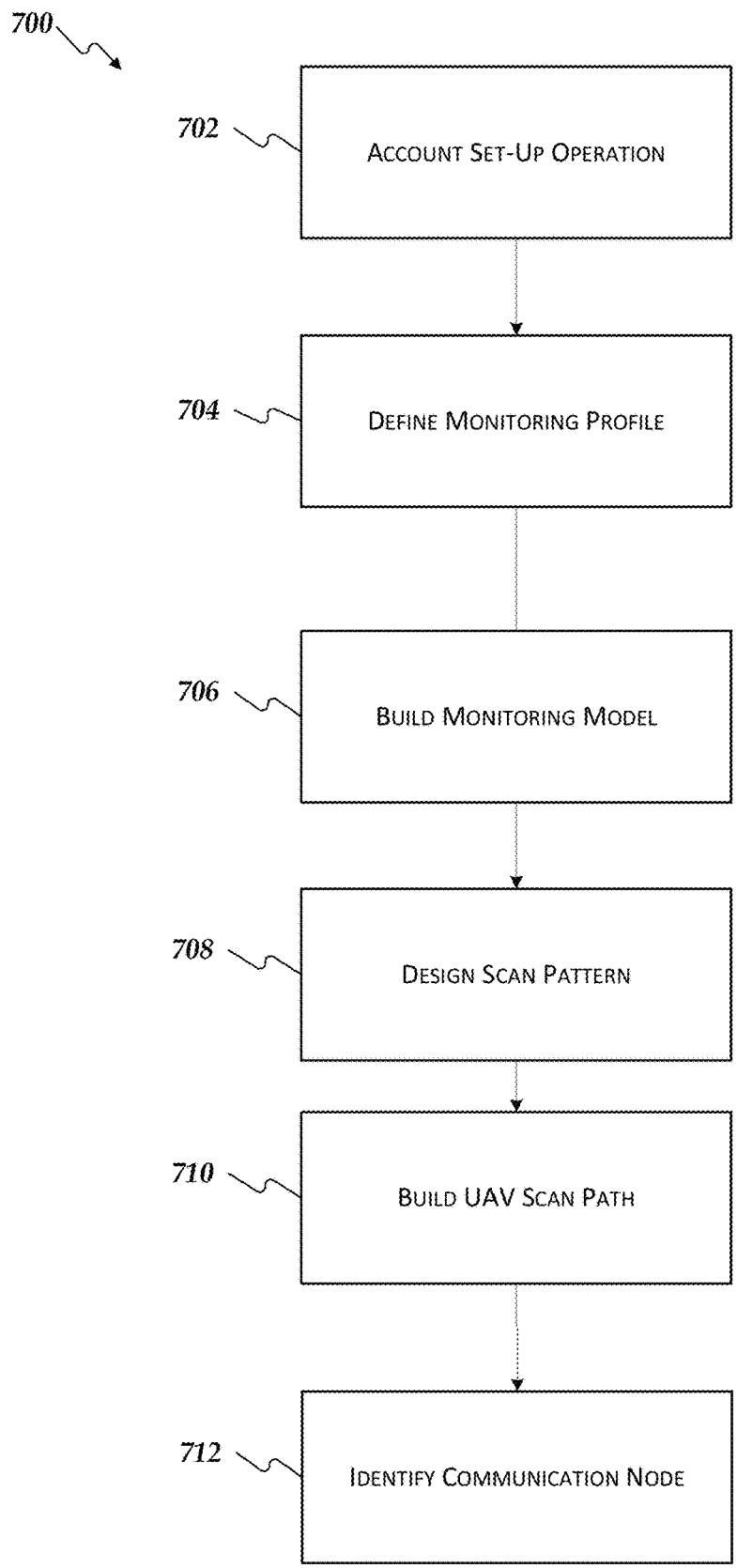
FIG. 7 illustrates a method 700 of initializing field monitoring.

FIG. 7 illustrates a method 700 of initializing field monitoring. Method 700 begins with account set up operation 702. In operation 702, an agricultural field account may be established. In aspects, the field account includes data associated with a field. Such data may be stored in a relational database. For example, a user may enter information regarding a particular agricultural field, information may be accessed using another source, and/or information may be obtained from sensors. Agricultural field information may include, for example, GPS coordinates of the field, property boundaries of the field, physical address of the field, and planting information (e.g., number of individual plants, layout of planting, type of planting, etc.).

Account information may also include information related to treatment preferences. For example a user may specify that the farming practice must be USDA organic compliant. As another example, a user may specify that specific brands of pesticides are to be used. Additionally/alternatively watering schedules, plowing schedules, and other logistical information may be included.

Further, a user may also relate various sensors and other equipment to the agricultural field. For example UAVs, stationery sensors, pods, temperature gauges, moisture gauges, etc., may be provided. These sensors may be identified generally with the field (e.g., UAVs), or may be tied to a specific GPS location within the field (e.g., stationery sensors).

Other information may be captured at operation 702. For example, various sources of information may be received relating to the field identified. This includes third-party weather services (e.g., websites) providing weather-related data in the geographic area of the field. Additionally, general historical data related to the specified crops, planting pattern, environment, etc., may be gathered.

Using the information, a field profile may be created at operation 704. For example, the following field profile may be created:

CHART 1

| Description | Data Source | Value | Data Type | Field ID |
| --- | --- | --- | --- | --- |
| Crop Type | User Entered | Corn | String | 12034 |
| Organic_Compliant | User Entered | NO | Boolean | 12034 |
| UAV_Identifier | UAV | 14344 | Number | 12034 |
| Temperature Sensor_Identifier | Sensor | 72.4 Fahrenheit | String | 12034 |
| Historical weather | URL | {0 in., .2 inches, .3 inches, 0 inches, . . . } | Array | 12034 |
| Relative Humidity Sensor_Identifier | Sensor | 56.2 RH | Number | 12034 |
| pH Sensor_Identifier | Sensor | 7.2 pH | Number | 12034 |
| Moisture Sensor_Identifier | Sensor | 10.1 VWC | Number | 12034 |
| Soil EC Sensor_Identifier | Sensor | 2.1 mS/M | Number | 12034 |
| Crop Spacing | User Entered/ Integrated | 12.0 inches (distance between rows) | Number | 12034 |
| Crop Distance | User Entered/ Integrated | 5.0 inches or lbs/acre | Number | 12034 |
| Crop Characterization | User Entered | {GerminationPeriod = 2, DroughtResistent = True, . . . } | Array | 12034 |
| Crop historic yields | User Entered/ Integrated/ URL | {{Year = "2010", Crop = "Corn", AvgYield = "181.23"}, {Year = "2013", Crop = "Corn", AvgYield = "192.18"}, . . . } | Array | 12034 |

As may be seen in Chart 1, various information sources may be associated with a particular field. In chart number 1, information sources have been identified and associated with unique Field ID 12034. It will be appreciated that more or less information sources may be associated with a particular field, and the data type may be changed as desired. As an a example, the descriptions of the information sources provide information on the particular field. As illustrated, a field associated with the unique identifier 12034 is growing corn (as indicated by crop type=corn), is not (as indicated by organic compliant status=no), etc., UAV_identifier, temperature_sensor_identifier, and historical weather. Data sources may be generated from a piece of equipment (e.g., a unique identifier associated with a temperature sensor), may be received from the user (e.g., designating the field as USDA organic compliant), or may be received from a third-party (e.g., weather information obtained from the national weather services).

The method then proceeds to define monitoring profile operation 706. In operation 706, a monitoring profile may be defined using the inputs received at operation 702 and/or the profile created at operation 704. For example, a user may have identified that the crop is corn. The historical weather information may indicate that the environment is one with above average rainfall. Based on this information, it may be identified that the most likely cause of harm to the crop is plant fungus. As such, a monitoring profile may be developed to sweep for moisture content on an above-average frequency using sensors identified and associated with the field at operation 702 that are capable of sensing moisture. Identification of the most likely harm(s) to the crop may occur using a variety of techniques including regression analysis, machine learning models, or a rule-based system. In other examples, scan rates are set based on a variety of factors including device power consumption, need of information, and the like.

The monitoring profile may be used to change the monitoring rate of one or more sensors associated with a field. For example, using the field profile generated in operation 702, various sensors associated with a field may be identified. Continuing with the example above, a sensor may be identified that is capable of monitoring moisture content in the soil. These sensors may have a default scan rate. The scan rate of the moisture sensor may be increased based on identifying that the corn crop's most likely cause of failure is fungus.

The method then proceeds to design scan pattern operation 708. A scan pattern includes the frequency and order particular field may be scanned. Determining a scan pattern may include the pattern that stationary sensors send information, the pattern/timing at which UAVs are used to scan portions of the field, etc. In operation 708 a scan pattern is determined for a field based on a variety of information including the information/factors identified in the agricultural field profile discussed above. These factors may include the monitoring profile determined at operation 706. In particular, and continuing with the example above, the monitoring profile may indicate that moisture should be monitored at a higher frequency than typical for that field. Accordingly, in operation 708, sensors capable of detecting moisture are identified. A pattern of activating particular scanners among a plurality of sensors may be determined to maximize the coverage of the scan while minimizing the number of scans. Additionally, in areas where there are no static sensors, a schedule of UAV scans may be determined.

Method 700 then proceeds to build UAV scan path operation 710. At operation 710, a typical flightpath for UAVs is determined. For example, if it is determined that temperature readings of crops may be necessary on a regular basis, and a UAV is equipped with a temperature probe, then a UAV scan path including frequency of path, flightpath, and related information, may be determined at operation 706.

In operation 710, the flightpath of a UAV may be determined using information received from a variety of information. For example, the current wind direction, the speed of the wind, and other environmental factors may be considered when creating a UAV flightpath. This information may include information stored in the field profile at operation 706.

Additionally, the flightpath of UAVs may be determined from equipment information of the particular UAV. For example, a UAV associated with a particular field may have power capacity and consumption limits. These power capacity and consumption limits may be used to determine the maximum distance a UAV can fly. Accordingly, a proposed flight path may be evaluated against this maximum distance to determine whether or not the route needs to be recalculated. If the route exceeds the maximum distance, the flight path may be changed (e.g., by removing one or more treatment areas, identifying a different UAV, etc.)

In addition, the flightpath may be determined based on whether the UAV has recharge/refuel points. For example, the field profile may include whether/where the location is of places where a UAV can refuel/recharge. This may include recharging stations, pods, or other areas. In aspects of the current technology, the flightpath of the UAVs is based on a return path of the UAV. In other aspects, a particular UAV need not dock at the same location from where it departed.

Additionally, in operation 710, the flightpath of a UAV may be determined by other requests for monitoring using the UAV. For example, while a particular UAV may be associated with a field (e.g., the association described with reference to operation 702), the UAV may have been associated with multiple other fields. As such, the flight plan for a particular UAV may be altered, added to, or removed based on other requests to use that UAV.

The method then proceeds to identify communication node 712. In aspects, a particular field may have communications nodes (e.g., relay) that is in proximity to a UAV or other sensor. This may be useful where the UAV/sensor does not have the long distance communication capability. The communication node may be identified to push information (e.g., scan rate and/or flight path) to a UAV or sensor.

Figure 8:
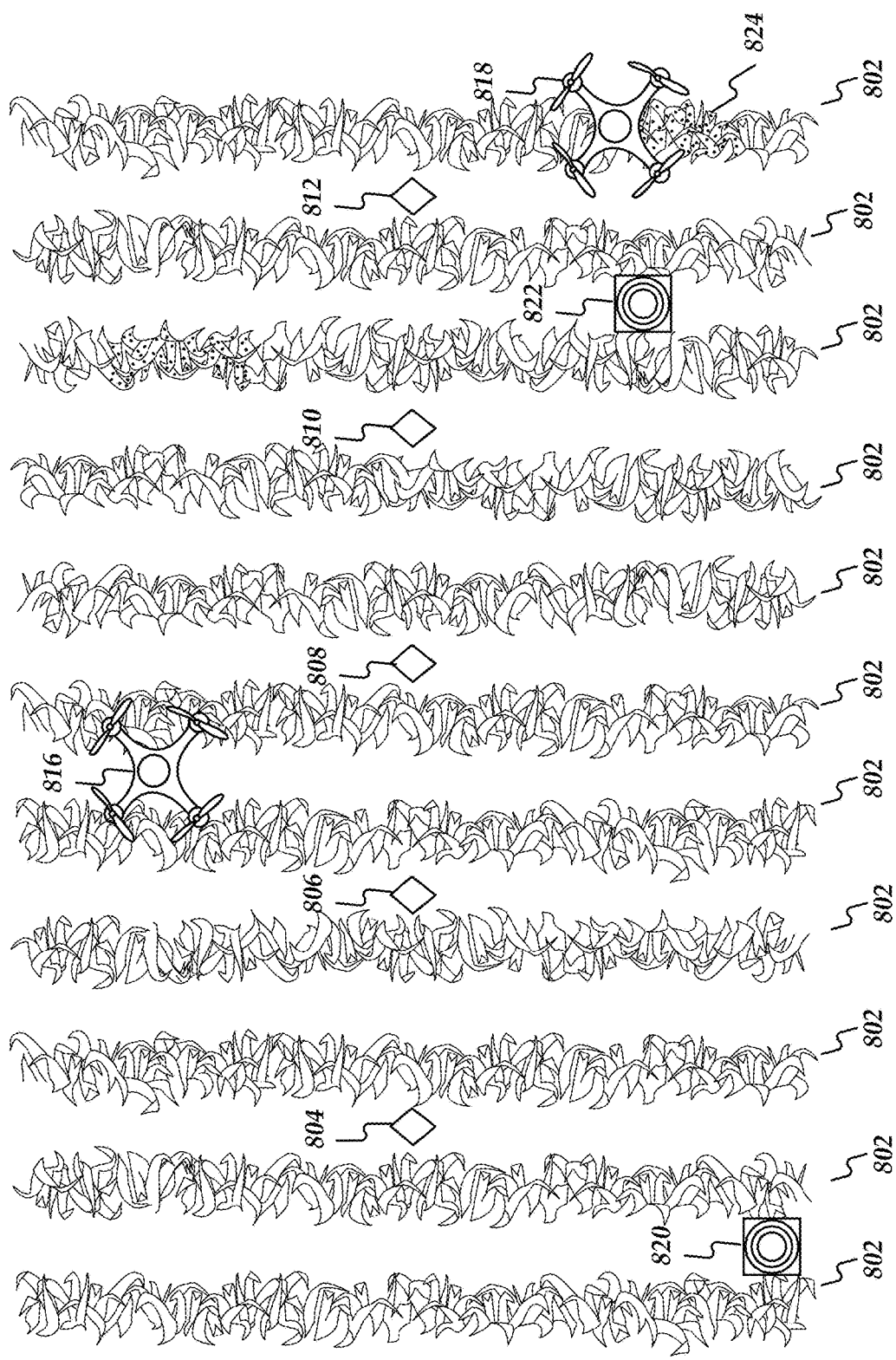
FIG. 8 illustrates an example of an agricultural field.

FIG. 8 illustrates an example of an agricultural field with rows of crops 802, a first sensor 804, a second sensor 806, a third sensor 808, a fourth sensor 810, and a fifth sensor 812. Further, FIG. 8 illustrates a first drone 816, a second drone 818, a first reloading POD 820, and a second reloading POD 822. Additionally, targeted portion 824 of the agricultural field 800 are also illustrated.

A reloading POD may serve several functions. For example, a reloading POD may serve as a recharging/refueling station for a UAV. Additionally, the reloading POD may serve as a storage place for a UAV. Further, a reloading POD may serve as a communications relay for an agricultural field health system and sensors/UAVs.

As illustrated, the rows of crops 802 are equally spaced in the agricultural field 800, though they need not be. The rows of crops 802 may represent a planting pattern of an actual agricultural field. Metadata associated with the rows of crops 802 may be associated with the rows of crops, such as planting date/time, species, treatment pattern, etc.

First sensor 804, second sensor 806, third sensor 808, fourth sensor 810, and a fifth sensor 812 are illustrated. The sensors may be any type of sensors, such as sensors described above. In aspects, the sensors are in electronic communication with one or more of the first drone 816, the second drone 818, the first reloading POD 820, and the second reloading POD 822. In aspects, the first reloading POD 820 and the second reloading POD 822 serve as a communications relay from a computer system, such as a field health system described above.

In aspects of the technology, a first reloading POD 820 may receive routing and dispatch instructions from one or more computers (not shown). For example, the first reloading POD 820 may receive information regarding setting the first sensor's scan rate. Such communication may be received via mobile, cellular, radio, or other form of communication. In a particular example, the first reloading POD 820 may act as a relay to the first sensor 804. For example, the first reloading POD 820 may send information (e.g., a changed scan rate) to the first sensor 804.

A second reloading POD 822 is also shown. The second reloading POD 822 may also receive information. The second reloading POD 822 may be placed so that the pod can relay information to the third sensor 808, the fourth sensor 810, and the fifth sensor 812. That is, various PODs may be dispersed around agricultural fields in order to serve as a relay for information from a computer system, such as a field health system described above, and sensors/UAVs.

As illustrated, the second UAV 816 is treating a targeted portion 824. Contemporaneously to the treatment, the second UAV 818 may receive instructions from the second pod indicating to continue to treat a first portion 814. This may occur as a result of a first UAV 816 sending information regarding the health of the first portion to one or more computers. It may be determined not to use the first drone to treat the first targeted portion due to drone capability, energy life, energy consumption, etc.

Figure 9:
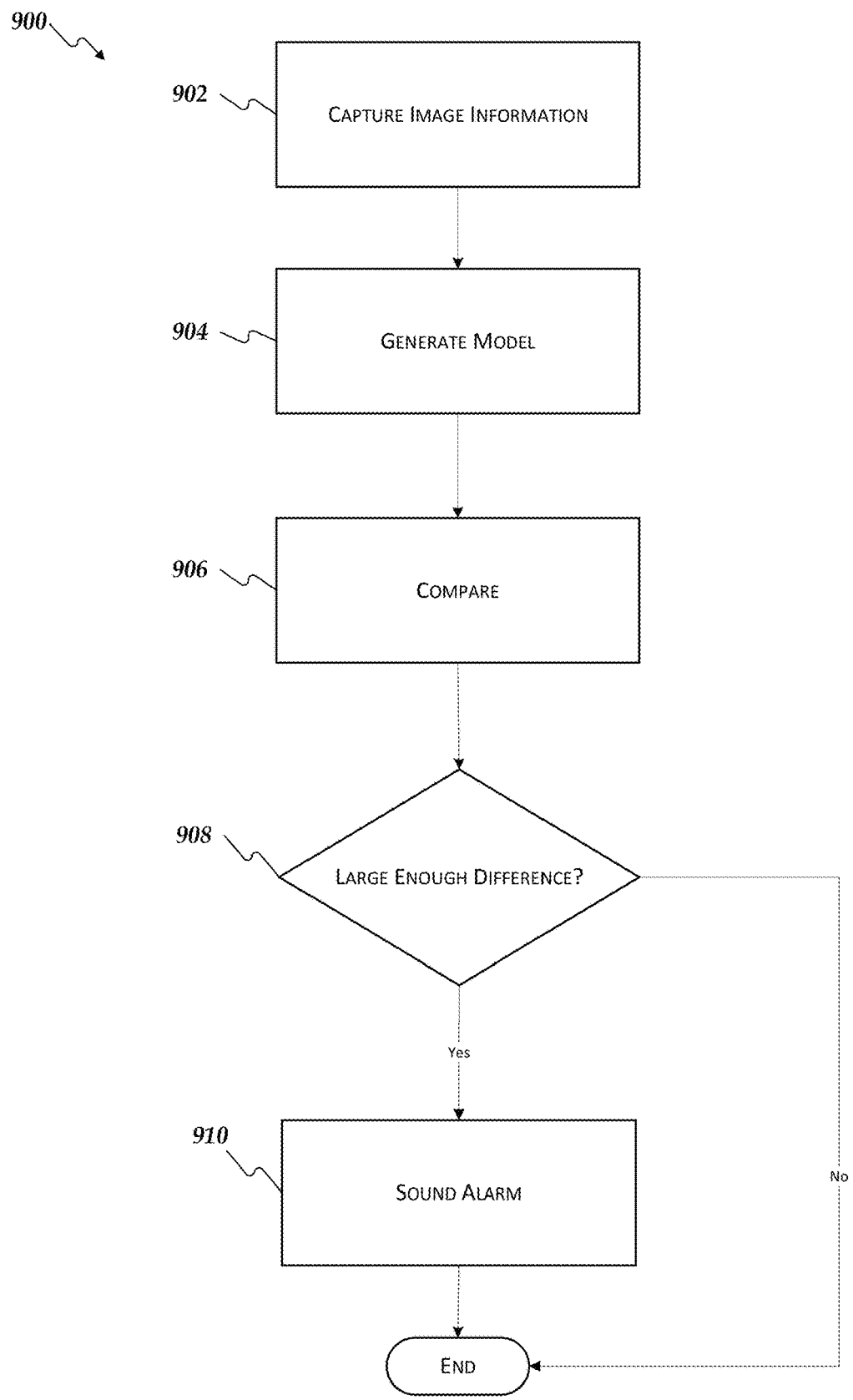
FIG. 9 illustrates a method 900 to interpret image data captured from sensors, such as UAVs.

FIG. 9 illustrates a method to interpret image data captured from sensors, such as UAVs.

Method 900 begins with collect image information operation 902. Collection of image information may include collecting Thermal, IMAGE, and 3D point cloud information.

Method 900 proceeds to generate model image 904. In operation 904, a model image includes color, density of image, etc. The model image may be created using images that were captured on a healthy field having a similar growth time. Additionally, a model image may be generated using a variety of techniques known in the art by using inputs, such as crop type, growing time, etc.

Method 900 proceeds to compare operation 906. In compare operation, the image data captured at operation 902 is compared against a baseline model image generated at operation 906. If there is a significant difference between the model image and the captured image, the method proceeds to generate alarm operation 908. If no significant difference is detected, the method ends.

Figure 10A:
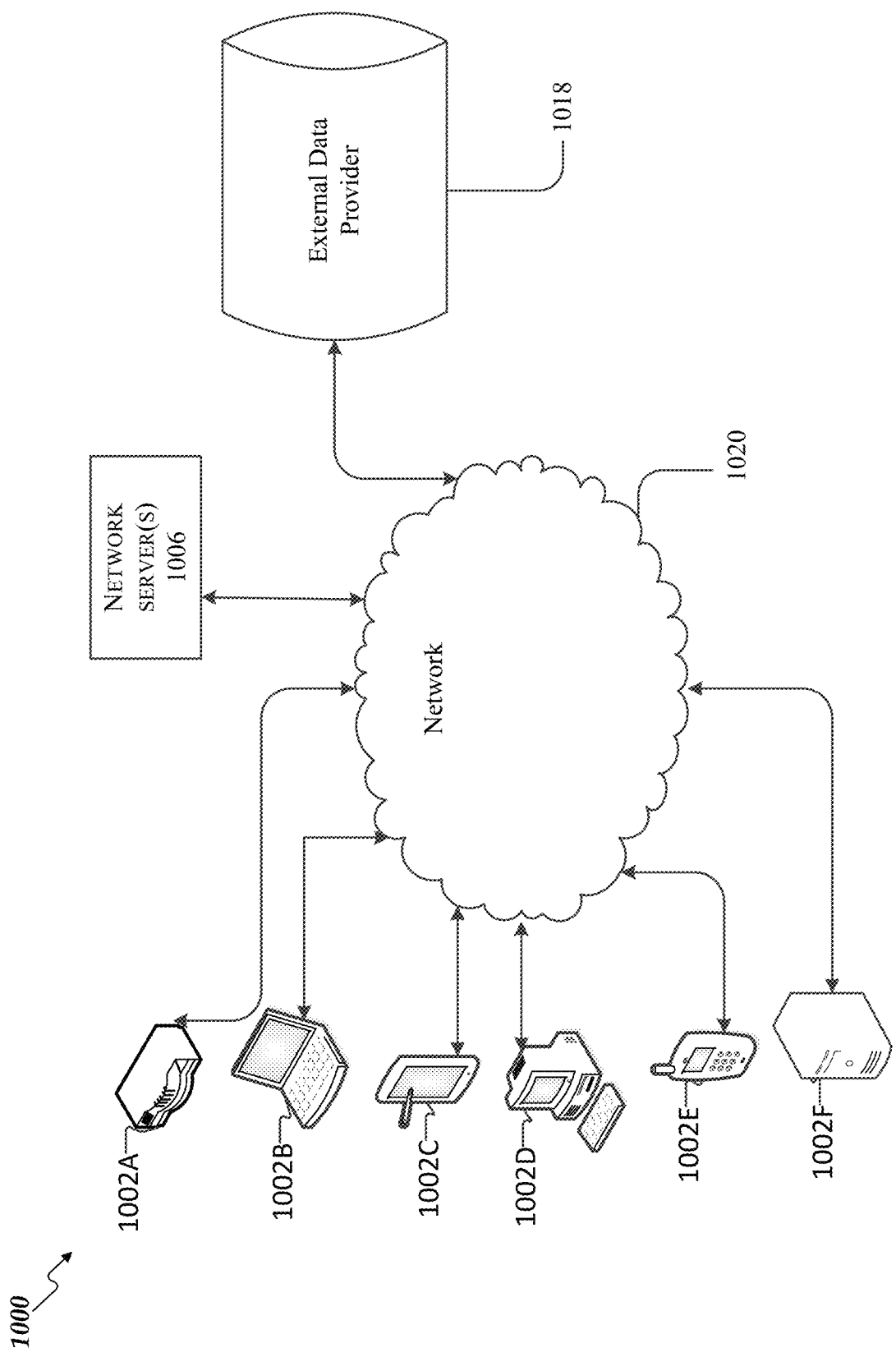
FIG. 10A is an example diagram of a distributed computing system in which aspects of the present invention may be practiced.

FIG. 10A is an example diagram of a distributed computing system in which aspects of the present invention may be practiced. According to examples, any of computing devices 1002A (a modem), 1002B (a laptop computer), 1002C (a tablet), 1002D (a personal computer), 1002E (a smart phone), and 1002F (a server) may contain modules, components, engines, etc. for dynamically monitoring and targeting agricultural fields. Additionally, according to aspects discussed herein, any of computing devices 1002A-F may contain necessary hardware for implementing aspects of the disclosure. Any and all of these functions may be performed, by way of example, at network servers 1006 and/or server 1002F when computing devices 1002A-F request or receive data from external data provider 1018 by way of network 1020.

Figure 10B:
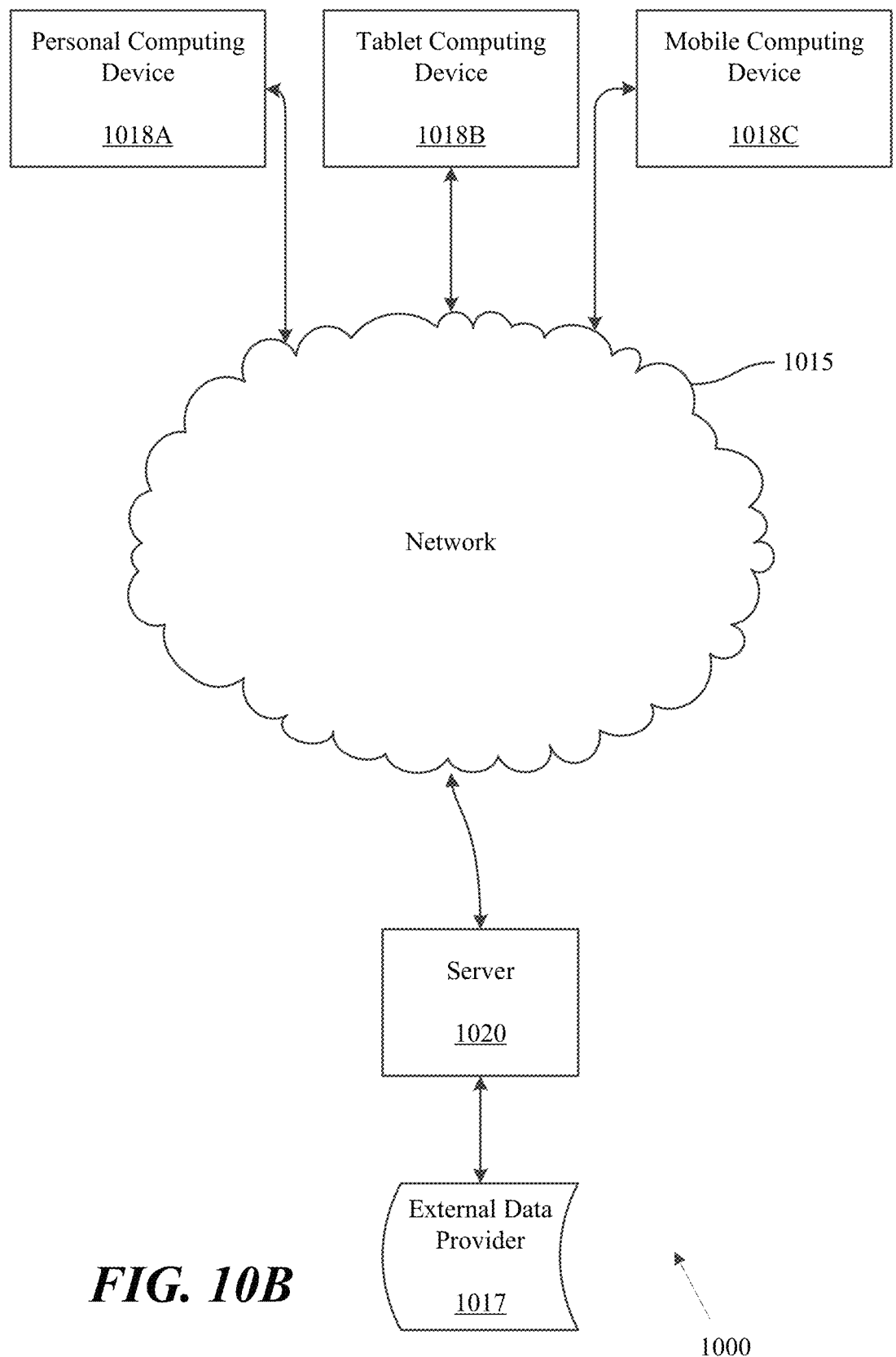
FIG. 10B is one embodiment of the architecture of a system for performing the technology discussed herein.

Turning to FIG. 10B, one embodiment of the architecture of a system for performing the technology discussed herein. Content and/or data interacted with, requested, or edited in association with one or computing devices may be stored in different communication channels or other storage types.

For example, data may be stored using a directory service, a web portal, a mailbox service, an instant messaging store, or a compiled networking service for managing preloaded and/or updated maps of agricultural fields. The system 1000 may be used for updating information about agricultural fields and identifying target plants as described herein. A computing device 1018A, 1018B, and/or 1018C may provide a request to a cloud/network 1015, which is then processed by a server 1020 in communication with an external data provider 1017. By way of example, a client computing device may be implemented as any of the systems described herein, and embodied in a personal computing device 1018A, a tablet computing device 1018B, and/or a mobile computing device 1018C (e.g., a smart phone). Any of these aspects of the systems described herein may obtain content from the external data provider 1017.

In various embodiments, the types of networks used for communication between the computing devices that makeup the present invention include, but are not limited to, an Internet, an intranet, wide area networks (WAN), local area networks (LAN), virtual private networks (VPN), GPS devices, SONAR devices, cellular networks, and additional satellite based data providers such as the Iridium satellite constellation which provides voice and data coverage to satellite phones, pagers and integrated transceivers, etc. According to aspects of the present disclosure, the networks may include an enterprise network and a network through which a client computing device may access an enterprise network. According to additional aspects, a client network is a separate network accessing an enterprise network through externally available entry points, such as a gateway, a remote access protocol, or a public or private Internet address.

Additionally, the logical operations may be implemented as algorithms in software, firmware, analog/digital circuitry, and/or any combination thereof, without deviating from the scope of the present disclosure. The software, firmware, or similar sequence of computer instructions may be encoded and stored upon a computer readable storage medium. The software, firmware, or similar sequence of computer instructions may also be encoded within a carrier-wave signal for transmission between computing devices.

Operating environment 1000 typically includes at least some form of computer readable media. Computer readable media can be any available media that can be accessed by a processor such as processing device 1180 depicted in FIG. 11 and processor 1202 shown in FIG. 12 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 1000 may be a single computer operating in a networked environment using logical connections to one or more remote computers. The remote computer may be a personal computer, a GPS device, a monitoring device such as a static-monitoring device or a mobile monitoring device, a pod, a mobile deployment device, a server, a router, a network PC, a peer device or other common network node, and typically includes many or all of the elements described above as well as others not so mentioned. The logical connections may include any method supported by available communications media. Such networking environments are commonplace in enterprise-wide computer networks, intranets and the Internet.

Figure 11:
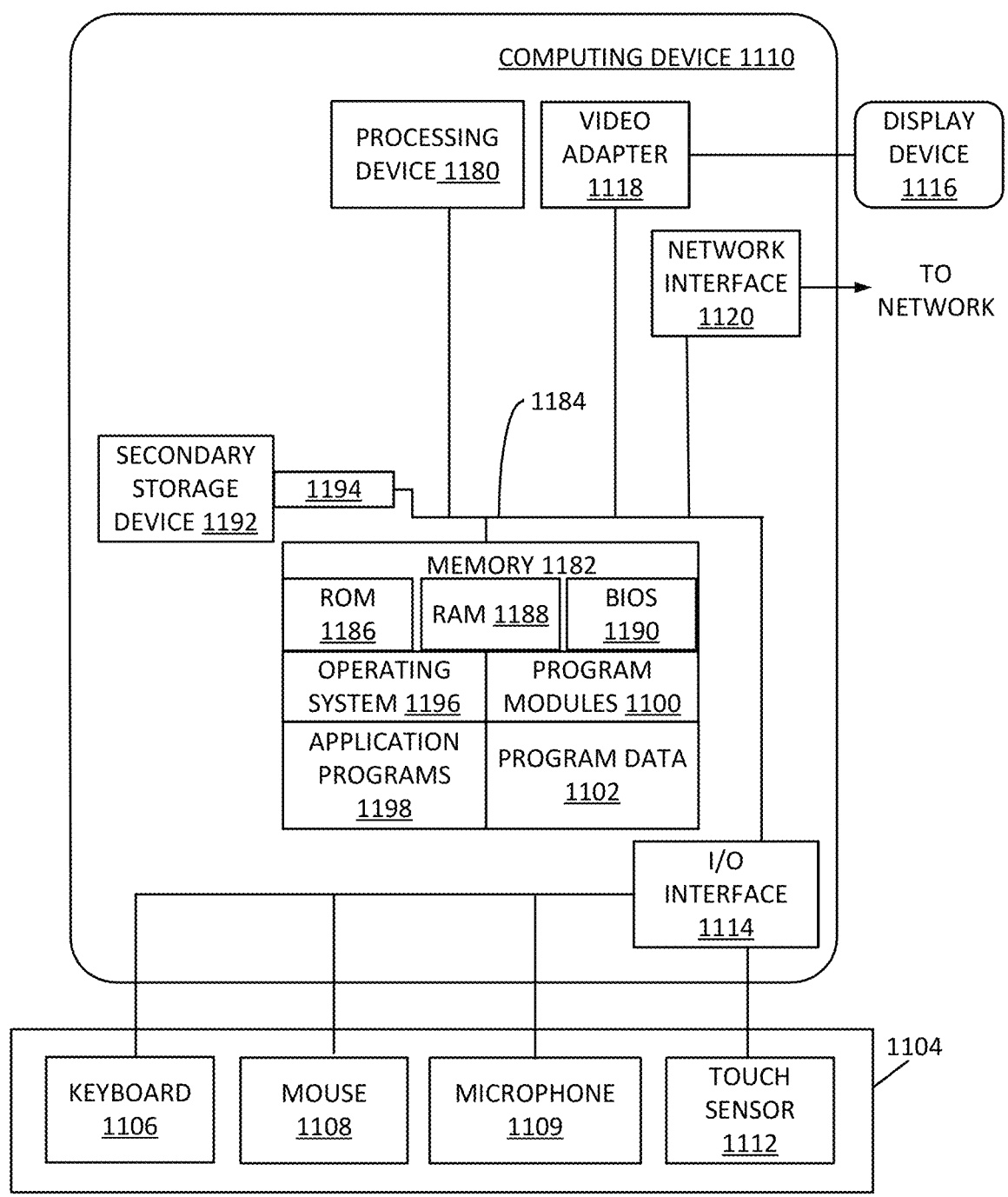
FIG. 11 illustrates one aspect in which an exemplary architecture of a computing device according to the disclosure that can be used to implement aspects of the present disclosure, including any of the plurality of computing devices described herein with reference to the various figures and their corresponding descriptions.

FIG. 11 illustrates one aspect in which an exemplary architecture of a computing device according to the disclosure that can be used to implement aspects of the present disclosure, including any of the plurality of computing devices described herein with reference to the various figures and their corresponding descriptions. The computing device illustrated in FIG. 11 can be used to execute the operating system, application programs, and software modules (including the software engines) described herein, for example, with respect to FIG. 12 and program modules 1214, data reception module 1216, Field Monitoring module 1218, Field targeting module 1220. By The computing device 1110 includes, in some embodiments, at least one processing device 1180, such as a central processing unit (CPU). A variety of processing devices are available from a variety of manufacturers, for example, Intel, Advanced Micro Devices, and/or ARM microprocessors. In this example, the computing device 1110 also includes a system memory 1182, and a system bus 1184 that couples various system components including the system memory 1182 to the processing device 1180. The system bus 1184 is one of any number of types of bus structures including a memory bus, or memory controller; a peripheral bus; and a local bus using any of a variety of bus architectures.

Examples of devices suitable for the computing device 1110 include a server computer, a pod, a mobile-monitoring device, a mobile deployment device, a static-monitoring device, a desktop computer, a laptop computer, a tablet computer, a mobile computing device (such as a smart phone, an iPod® or iPad® mobile digital device, or other mobile devices), or other devices configured to process digital instructions.

The system memory 1182 includes read only memory 1186 and random access memory 888. A basic input/output system 1190 containing the basic routines that act to transfer information within computing device 1110, such as during start up, is typically stored in the read only memory (ROM) 1186.

The computing device 1110 also includes a secondary storage device 1192 in some embodiments, such as a hard disk drive, for storing digital data. The secondary storage device 1192 is connected to the system bus 1184 by a secondary storage interface 1194. The secondary storage devices 1192 and their associated computer readable media provide nonvolatile storage of computer readable instructions (including application programs and program modules), data structures, and other data for the computing device 1110. Details regarding the secondary storage devices 1192 and their associated computer readable media, as well as their associated nonvolatile storage of computer readable instructions (including application programs and program modules) will be more fully described below with reference to FIG. 12.

Although the exemplary environment described herein employs a hard disk drive as a secondary storage device, other types of computer readable storage media are used in other aspects according to the disclosure. Examples of these other types of computer readable storage media include magnetic cassettes, flash memory cards, digital video disks, Bernoulli cartridges, compact disc read only memories, digital versatile disk read only memories, random access memories, or read only memories. Additional aspects may include non-transitory media. Additionally, such computer readable storage media can include local storage or cloud-based storage.

A number of program modules can be stored in secondary storage device 1192 or memory 1182, including an operating system 1196, one or more application programs 1198, other program modules 1100 (such as the software engines described herein), and program data 1102. The computing device 1110 can utilize any suitable operating system, such as Linux, Microsoft Windows™, Google Chrome™, Apple OS, and any other operating system suitable for a computing device.

According to examples, a user provides inputs to the computing device 1110 through one or more input devices 1104. Examples of input devices 1104 include a keyboard 1106, mouse 1108, microphone 1109, and touch sensor 1112 (such as a touchpad or touch sensitive display). Additional examples may include input devices other than those specified by keyboard 1106, mouse 1108, microphone 1109 and touch sensor 1112. The input devices are often connected to the processing device 1180 through an input/output interface 1114 that is coupled to the system bus 1184. These input devices 1104 can be connected by any number of input/output interfaces, such as a parallel port, serial port, game port, or a universal serial bus. Wireless communication between input devices and the interface 1114 is possible as well, and includes infrared, BLUETOOTH® wireless technology, cellular and other radio frequency communication systems in some possible aspects.

In an exemplary aspect, a display device 1116, such as a monitor, liquid crystal display device, projector, or touch sensitive display device, is also connected to the system bus 1184 via an interface, such as a video adapter 1118. In addition to the display device 1116, the computing device 1110 can include various other peripheral devices (not shown), such as speakers or a printer.

When used in a local area networking environment or a wide area networking environment (such as the Internet), the computing device 1110 is typically connected to a network such as network 220 shown in FIG. 2 and network 344 shown in FIG. 3 through a network interface 1120, such as an Ethernet interface. Other possible embodiments use other communication devices. For example, certain aspects of the computing device 1110 may include a modem for communicating across the network.

The computing device 1110 typically includes at least some form of computer readable media. Computer readable media includes any available media that can be accessed by the computing device 1110. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 1110. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 11 is also an example of programmable electronics, which may include one or more such computing devices, and when multiple computing devices are included, such computing devices can be coupled together with a suitable data communication network so as to collectively perform the various functions, methods, or operations disclosed herein.

Figure 12:
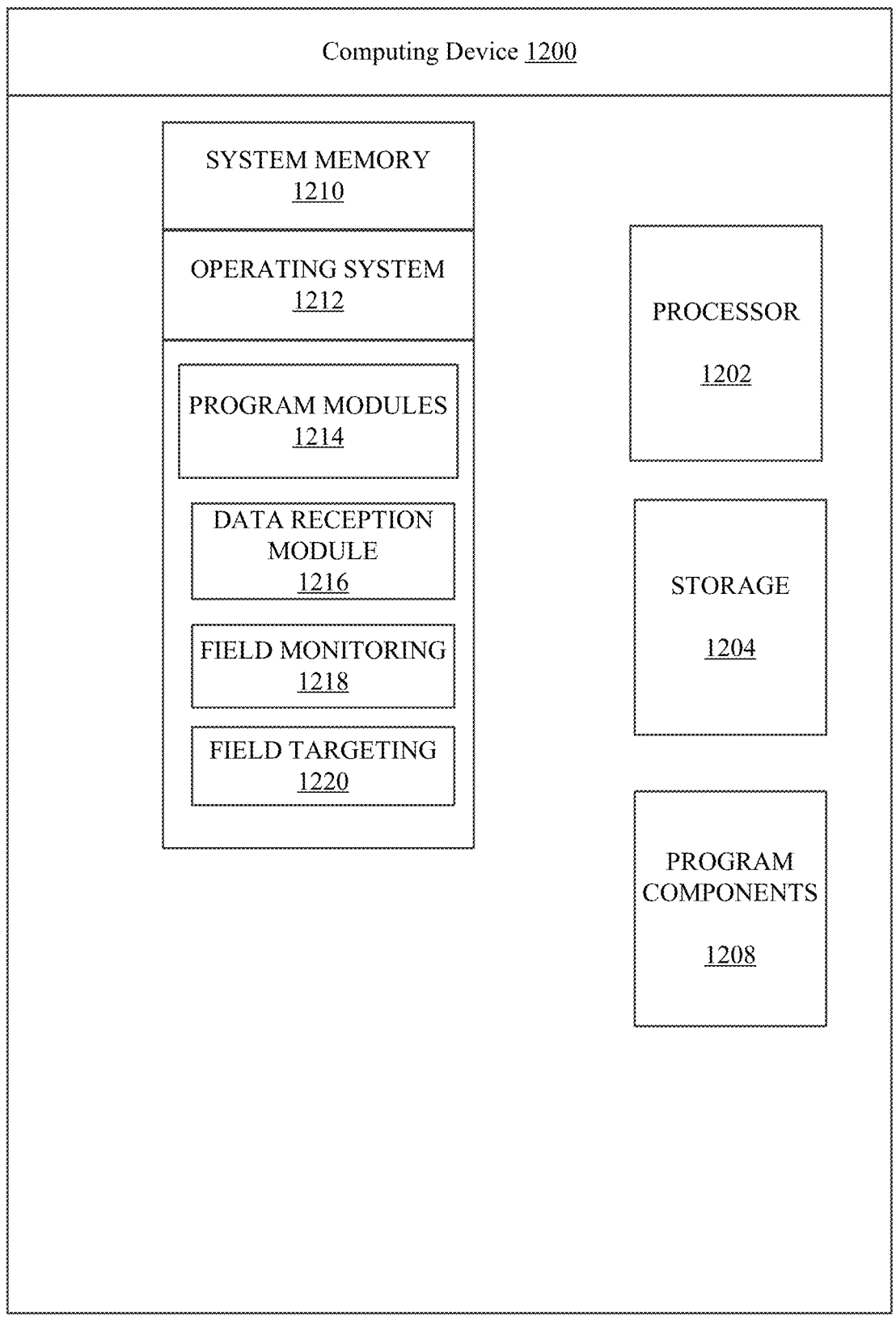
FIG. 12 is a block diagram illustrating additional physical components (e.g., hardware) of a computing device 1200 with which certain aspects of the disclosure may be practiced.

FIG. 12 is a block diagram illustrating additional physical components (e.g., hardware) of a computing device 1200 with which certain aspects of the disclosure may be practiced. Computing device 1200 may perform these functions alone or in combination with a distributed computing network such as those described with regard to FIGS. 10A and 10B which may be in operative contact with personal computing device 1018A, tablet computing device 1018B and/or mobile computing device 1018C which may communicate and process one or more of the program modules described in FIG. 12 including data reception module 1216, field monitoring module 1218, and field targeting module 1220.

In a basic configuration, the computing device 1200 may include at least one processor 1202 and a system memory 1210. Depending on the configuration and type of computing device, the system memory 1210 may comprise, but is not limited to, volatile storage (e.g., random access memory), non-volatile storage (e.g., read-only memory), flash memory, or any combination of such memories. The system memory 1210 may include an operating system 1212 and one or more program modules 1214. The operating system 1212, for example, may be suitable for controlling the operation of the computing device 1200. Furthermore, aspects of the disclosure may be practiced in conjunction with a graphics library, other operating systems, or any other application program and are not limited to any particular application or system.

The computing device 1200 may have additional features or functionality. For example, the computing device 1200 may also include additional data storage device (removable and/or non-removable) such as, for example, magnetic disks, optical disks, or tape. Such additional storage is illustrated in FIG. 12 by storage 1204. It will be well understood by those of skill in the art that storage may also occur via the distributed computing networks described in FIG. 10A and FIG. 10B. For example, computing device 900 may communicate via network 71020 in FIG. 10A and data may be stored within network servers 1006 and transmitted back to computing device 1200 via network 1020 if it is determined that such stored data is necessary to execute one or more functions described herein. Additionally, computing device 1200 may communicate via network 1015 in FIG. 10B and data may be stored within server 1020 and transmitted back to computing device 1200 via network 1015 if it is determined that such stored data is necessary to execute one or more functions described herein.

As stated above, a number of program modules and data files may be stored in the system memory 1210. While executing the processor 1202, the program modules 1214 (e.g., data reception module) may perform processes including, but not limited to, the aspects described herein.

Figure 13:
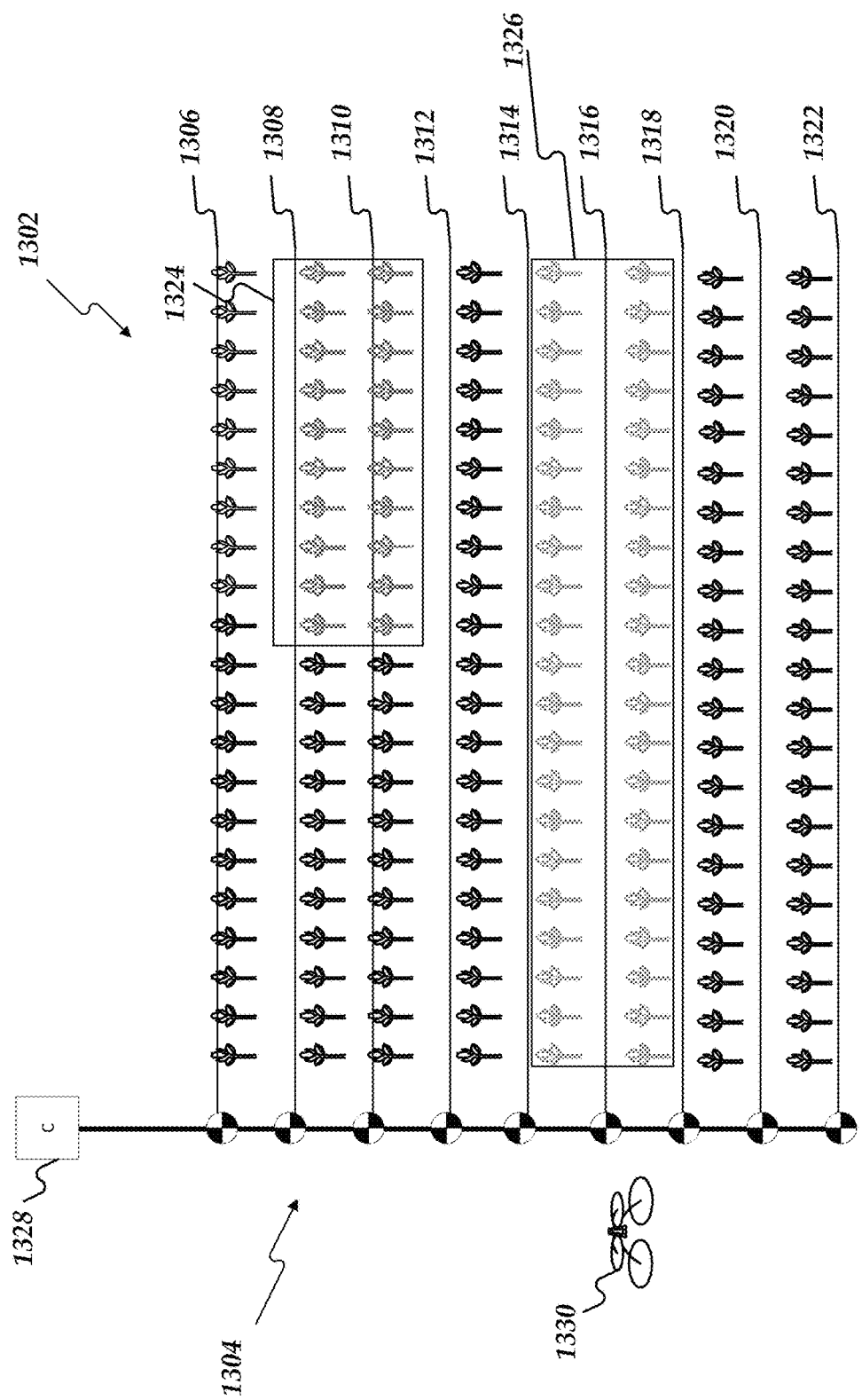
FIG. 13 illustrates an emitting irrigation system in which embodiments of the present disclosure may be practiced.

FIG. 13 illustrates an irrigation system in which embodiments of the present disclosure may be practiced. As illustrated, FIG. 13 includes a field 1302 and a distribution manifold 1304 in fluidic connection with irrigation emitting lines 1306, 1308, 1310, 1312, 1314, 1316, 1318, 1320, and 1322.

Field 1302 is illustrated as being rows of crops, though the crops need not be in a row. The crops may be oriented in any fashion. For illustration, portions of field 1302 are illustrated as being stressed. For example, a first portion 1324 may be stressed in any number of ways, such as high moisture content, low moisture content, fungus, disease, pests, etc. (i.e., a health issue). A second portion 1326 of the agricultural field may be stressed as well. The second portion 1326 of the agricultural field may have high moisture content, low moisture content, fungus, disease, pests, etc. The second portion 1326 may be the same, similar, or different crop type as the first portion 1324. Additionally, the type of stress may be the same or similar type of stress.

The irrigation emitting lines 1306, 1308, 1310, 1312, 1314, 1316, 1318, 1320, and 1322 may be configured to deliver a variety of nutrients, fungicides, herbicides, water, or other fluids to the agricultural field 1302. In some aspects of the technology, the irrigation emitting lines 1306, 1308, 1310, 1312, 1314, 1316, 1318, 1320, and 1322 are capable of being independently controlled such that parts of the agricultural field 1302 may receive different ratios of nutrients, fungicides, herbicides, water, and other fluids than other parts of the irrigation field. In particular, a first portion 1324 may receive different ratios of fluids than a second portion 1326.

Delivering different ratios of fluids may occur through the use of a distribution manifold 1304 in conjunction with a controller 1328. In aspects of the technology, the distribution manifold 1304 has a variety of valve manifolds, pumps, and pressure regulation valves. In aspects of the technology, the distribution manifold 1328, in conjunction with the controller, facilitates the delivery of water, nutrients, fungicides, and pesticides through the irrigation emitting 1306, 1308, 1310, 1312, 1314, 1316, 1318, 1320, and 1322. Furthermore, a variety of instrumentation may be used in connection with each of the irrigation emitting lines. Such instrumentation includes pressure, flow, and/or mass meters, temperature meters, and the like. The controller 1328 may be in electronic communication with the various valves, pumps, and instruments in order to control/monitor the delivery of water, nutrients, fungicides, and pesticides to various parts and/or portions of the agricultural field 1302.

In aspects of the technology, the irrigation emitting lines are subsurface distribution irrigation (SDI) lines. As used herein, an SDI line is a form of irrigation for crops that involves the use of small tubes with regular spaced emitters. In some aspects of the technology, the SDI lines tubes are buried 6-10 inches deep. For certain applications, the use of SDI lines may result in a 25-50% reduction in water usage and decrease of nitrate and other fertilizer leaching caused by runoff. In aspects of the technology, the SDI lines may also have imbedded sensors, such as moisture content sensors, to assess the health of the agricultural field.

In aspects of the technology, a variety of vehicles may roam the field 1302 and gather information regarding the health of the field 1032. While a UAV 1330 is illustrated, other types of vehicles are contemplated. In aspects of the technology, a UAV 1330 may scan the field to identify portions of the field, such as the first portion 1324 and the second portion 1326. Identification of the field health issues may occur using the systems and methods described above. The identified portions, or treatment instructions, may be sent to the controller 1328 to treat certain portions of the field, such as a first portion 1324 and a second portion 1326.

The various examples described above are provided by way of illustration only and should not be construed to limit the claims attached hereto. Those skilled in the art will readily recognize various modifications and changes that may be made without following the various aspects, examples and applications illustrated and described herein, and without departing from the true spirit and scope of the following claims.

What is claimed:

1. A computer implemented method comprising:
   receiving agricultural field data comprising a time indicator and information regarding a physical state of an agricultural field;
   comparing the agricultural field data to a baseline to generate a comparison;
   based on the comparison, identifying an anomaly associated with at least a portion of the agricultural field;
   identifying related anomalies that relate to the information regarding the physical state of the agricultural field;
   aggregating the related anomalies;
   determining a count of the related anomalies;
   determining that the count exceeds a frequency threshold; and
   identifying a treatment for the agricultural field in response to determining that the count exceeds the frequency threshold; and
   sending computer instructions comprising the treatment to a device, wherein the device performs the treatment on the portion of the agricultural field when the computer instructions are executed.

2. The method of claim 1, wherein the agricultural field data comprises: an infrared image of an agricultural field.

3. The method of claim 1, further comprising:
   receiving information for a plurality of agricultural fields;
   determining that at least a portion of the plurality of agricultural fields is related by an attribute;
   aggregating information on the at least the portion of the plurality of agricultural fields to form the baseline.

4. The method of claim 1, wherein the device is an unmanned aerial vehicle.

5. The method of claim 1, wherein comparing the agricultural field data to the baseline comprises:
   identifying a threshold of the baseline; and determining that the agricultural field data exceeds the threshold.

6. The method of claim 1, wherein the anomaly comprises one or more of: an invasive species, a mold, an insect infestation, and a drought condition.

7. The method of claim 1, wherein the device is one of an unmanned aerial vehicle, a remote controlled ground vehicle, or an irrigation controller.

8. The method of claim 1, wherein the computer instructions instruct the device to apply one or more of: water, a barricade, fungicide, pesticide, herbicide, fertilizer, butane, and nutrients.

9. The method of claim 1, wherein the treatment to take on the portion of the agricultural field is a physical application.

10. A computer implemented method comprising:
receiving field information regarding an agricultural field, the field information comprising a data tag that associates the field information with the agricultural field, a location tag that associates the data tag with a location, a measurement type that associates the data tag with a measurement, and a measurement value;
detecting an anomaly in the field information by:
identifying historical information that relates to the location tag, the data tag, and the measurement type;
comparing the historical information to the measurement value to identify a delta;
determining that the delta exceeds a threshold;
flagging the anomaly to create a flagged anomaly; and
identifying related flagged anomalies that relate to the location tag and the measurement type;
aggregating the related flagged anomalies;
determining a count of the related flagged anomalies;
determining that the count exceeds a frequency threshold; and
identifying a treatment for the agricultural field in response to determining that the count exceeds the frequency threshold.

11. The method of claim 10, further comprising:
identifying a plurality of potential treatments based on the measurement value, wherein the plurality of treatments includes at least a first treatment associated with a first probability and a second treatment associated with a second probability;
determining that the first treatment has been attempted at the location prior to receiving the field information; and
determining to treat the location using the second treatment.

12. The method of claim 11, further comprising:
receiving a conformation from a user interface to treat the location using the second treatment; and
treating the location with the second treatment.

13. The method of claim 12, wherein treating the second location comprises:
sending instructions to a controller; and
determining, by the controller, to deliver a blend of nutrients to the location.

14. A computer system comprising a processor in electronic communication with computer-readable media, the computer readable media storing instructions that when executed by the processor cause the processor to perform the actions comprising:
receiving agricultural field data, the agricultural field data comprising a time indicator and information regarding a physical state of an agricultural field;
comparing the agricultural field data to a baseline to generate a comparison;
based on the comparison, identifying an anomaly associated with at least a portion of the agricultural field;
identifying related anomalies that relate to the information regarding the physical state of the agricultural field;
aggregating the related anomalies;
determining a count of the related anomalies;
determining that the count exceeds a frequency threshold; and
identifying a treatment for the agricultural field in response to determining that the count exceeds the frequency threshold; and
sending computer instructions comprising the treatment to a device, wherein the device performs the treatment on the portion of the agricultural field when the computer instructions are executed.

15. The computer system of claim 14, wherein the agricultural field data comprises: an infrared image of an agricultural field.

16. The computer system of claim 14, wherein the actions further comprise:
receiving information on a plurality of agricultural fields;
determining that at least a portion of the plurality of agricultural fields is related by an attribute; and
aggregating information on the at least the portion of the plurality of agricultural fields to form the baseline.

17. The computer system of claim 14, wherein the actions further comprise:
sending the computer instructions to an unmanned aerial vehicle.

18. The computer system of claim 14, wherein the actions further comprise:
identifying a threshold of the baseline; and
determining that the agricultural field data is above the threshold.

19. The computer system of claim 14, wherein the anomaly comprises at least one of an invasive specifies, a mold, an insect infestation, and a drought condition.

20. Computer storage media storing instructions that, when executed, cause the performance of a method, the method comprising:
receiving agricultural field data, the agricultural field data comprising a time indicator and information regarding a physical state of an agricultural field;
comparing the agricultural field data to a baseline;
based on the comparison, identifying an anomaly associated with a portion of the agricultural field;
identifying related anomalies that relate to the information regarding the physical state of the agricultural field;
aggregating the related anomalies;
determining a count of the related anomalies;
determining that the count exceeds a frequency threshold; and
identifying a treatment for the agricultural field in response to determining that the count exceeds the frequency threshold; and
sending computer instructions, the computer instructions including instructions that cause a device to perform the treatment on the portion of the agricultural field when the computer instructions are executed.

* * * * *